US010748092B2

(12) United States Patent
Levermore et al.

(10) Patent No.: US 10,748,092 B2
(45) Date of Patent: Aug. 18, 2020

(54) SYSTEMS AND METHODS FOR CREATING INTUITIVE CONTEXT FOR ANALYSIS DATA

(75) Inventors: David Monroe Levermore, Colmar, PA (US); John Mark Gardner, Newcastle, WA (US); Jack Blaylock, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1446 days.

(21) Appl. No.: 13/155,076

(22) Filed: Jun. 7, 2011

(65) Prior Publication Data
US 2012/0316821 A1 Dec. 13, 2012

(51) Int. Cl.
*G06Q 10/06* (2012.01)
(52) U.S. Cl.
CPC .................. *G06Q 10/06* (2013.01)
(58) Field of Classification Search
CPC .............. G06F 17/248; G06Q 10/06
See application file for complete search history.

(56) References Cited

U.S. PATENT DOCUMENTS

| | | |
|---|---|---|
| 6,799,187 B2 | 9/2004 | Beggs et al. |
| 6,816,762 B2 | 11/2004 | Hensey et al. |
| 7,076,498 B2 | 7/2006 | Banerjee et al. |
| 7,127,458 B1 | 10/2006 | Mantripragada et al. |
| 7,280,880 B2 | 10/2007 | Schmale |
| 7,340,319 B2 | 3/2008 | Hawman et al. |
| 7,420,563 B2 | 9/2008 | Wakabayashi |
| 7,587,484 B1 | 9/2009 | Smith et al. |
| 7,627,588 B1 | 12/2009 | Mohan et al. |

(Continued)

FOREIGN PATENT DOCUMENTS

| | | |
|---|---|---|
| CN | 101782916 A | 7/2010 |
| JP | 2000331040 | 11/2000 |

(Continued)

OTHER PUBLICATIONS

Wikipedia, the free encyclopedia, Component Object Model, Mar. 31, 2011.*

(Continued)

*Primary Examiner* — Kyle R Quigley
(74) *Attorney, Agent, or Firm* — Womble Bond Dickinson (US) LLP

(57) ABSTRACT

One or more computer-readable storage media having computer-executable instructions embodied thereon are described. When executed, the computer-executable instructions cause at least one processor to define an analysis and an analysis data object related to a part, data for an analysis of the part at least partially available from a plurality of disparate applications related to the design, fabrication and testing of the part, verify that all the data needed for the analysis, as defined within the analysis data object, is available from at least one source of data, invoke an analysis of the part upon receipt of all of the data needed for the analysis, the analysis results populating the analysis data object, and storing the analysis data object such that the analysis results therein occur in a format unrelated to any of the applications that generated data used in the analysis.

26 Claims, 26 Drawing Sheets

(56) References Cited

U.S. PATENT DOCUMENTS

| | | | |
|---|---|---|---|
| 2003/0135840 A1* | 7/2003 | Szabo | G06F 9/541 717/102 |
| 2004/0167833 A1 | 8/2004 | Schickler | |
| 2006/0089737 A1 | 4/2006 | Forrester et al. | |
| 2007/0233436 A1* | 10/2007 | Ishikawa | G06F 17/5018 703/2 |
| 2008/0004882 A1* | 1/2008 | Papadimitriou et al. | 704/275 |
| 2008/0183402 A1* | 7/2008 | Malkin | G06F 17/5018 702/34 |
| 2008/0310756 A1* | 12/2008 | Tao | G06T 7/0051 382/285 |
| 2009/0222427 A1 | 9/2009 | Malkowicz et al. | |
| 2010/0287214 A1 | 11/2010 | Narasayya et al. | |
| 2011/0060601 A1* | 3/2011 | Stacklin | G06Q 10/00 705/1.1 |
| 2011/0072042 A1* | 3/2011 | Guarraci | G06F 17/30233 707/769 |

FOREIGN PATENT DOCUMENTS

| | | |
|---|---|---|
| JP | 2004062707 A | 2/2004 |
| JP | 2004126710 A | 4/2004 |
| JP | 2010033491 A | 2/2010 |

OTHER PUBLICATIONS

Extended European Search Report for Application No. 12171100.6; dated Sep. 26, 2012; 8 pages.

Tseng, F. et al.; The Concept of Document Warehousing for Multi-Dimensional Modeling of Textual-Based Business Intelligence; Decision Support Systems; Nov. 1, 2006; pp. 727-744; vol. 42, No. 2; Elsevier Science Publishers.

Ishikawa, H. et al; A Document Warehouse: A Multimedia Database Approach; Proceedings from 9th International Workshop; Aug. 26-28, 1998; pp. 90-94; Vienna, Austria.

Nassis, V. et al.; A Requirement engineering Approach for Sesigning XML-View Driven, XML Document Warehouses; Computer Software and Applications Conference; Jul. 26-28, 2005; IEEE vol. 1; pp. 388-395; Edinburgh, Scotland.

Moner,D. et al.; Archetype-Based Semantic Integration and Standardization of Clinical Data; Conference Proceedings of Annual International Conference of the IEEE Engineering in Medicine and Biology Society; Aug. 30-Sep. 3, 2006; pp. 5141-5144; New York, NY.

Maldonado, J. et al.; LinkEHR-Ed: A Multi-Reference Model Archetype Editor Based on Formal Semantics; International Journal of Medical Informatics; Aug. 2009; vol. 78, No. 8; pp. 559-570; Elsevier Scientific Publishers.

Bisbal, J. et al; Archetype-Based Semantic Mediation: Incremental Provisioning of Data Services; IEEE 23rd International Symposium on Computer-Based Medical Systems;Oct. 12, 2010; pp. 132-137.

European Search Report for Application No. 12171100.6-1238; dated Sep. 26, 2012; 8 pages.

Bisbal, J. et al; Archtype-Based Semantic Mediation: Incremental Provisioning of Data Services; Computer-Based Medical Systems, 2010 IEEE 23rd International Symposium; Oct. 12, 2010; pp. 132-137.

Ishikawa, H. et al.; A Document Warehouse: A Multimedia Database Approach; Database and Expert Systems Applications; Proceedings of 9th International Workshop—Vienna, Austria; Aug. 26-28, 1998; pp. 90-94; IEEE Comput. Soc., US.

Maldonado, J. et al.; LinkEHR-Ed: A Multi-Reference Model Archetype Editor Based on Formal Semantics; International Journal of Medical Informatics; Aug. 4, 2009; pp. 559-570; vol. 78, No. 8; Elsevier Scientific, Shannon, Ireland.

Moner, D. et al.; Archetype-Based Semantic Integration and Standardization of Clinical Data; Conference Proceedings Annual International Conference of the IEEE Engineering in Medicine and Biology Society; Aug. 30-Sep. 3, 2006; pp. 5141-5144; New York, NY.

Nassis, V. et al; A Requirement Engineering Approach for Designing XML-View Driven, XML Document Warehouses; Computer and Software and Application Conferences; Jul. 26-28, 2005; pp. 388-395; vol. 1, No. 26; Edinburgh, Scotland; IEEE, US.

Tseng, F. et al.; The Concept of Document Warehousing for Multi-Dimensional Modeling of Textual-Based Business.Intelligence; Detection Support Systems; Nov. 1, 2006; pp. 727-744; vol. 42, No. 2; Elsevier Science, Amsterdam, Netherlands.

Canada Office Action for related application 2773919 dated Sep. 21, 2016; 5 pp.

First China Office Action for related application No. 201210186902.X dated May 30, 2016; 20 pp.

JPO Office Action for related application 2012-127723 dated Jun. 21, 2016; 2 pp.

Second Chinese Office Action dated Feb. 3, 2017 for Application No. 201210186902.X.

European Examination Report dated Feb. 10, 2017 for Application No. 12 171 100.6.

Summons to Attend Oral Proceedings from corresponding European Patent Appl. No. 12171100.6, dated Mar. 15, 2018.

Preliminary Opinion of the Examining Division from corresponding European Patent Appl. No. 12171100.6, dated Jun. 6, 2018.

Marshak, R. T., "IBM Flow Mark 2.2 Expanding the Capabilities of Object-Oriented Workflow," Workgroup Computing Report, vol. 19, No. 7, Jul. 16, 1996, pp. 1, 3-19.

* cited by examiner

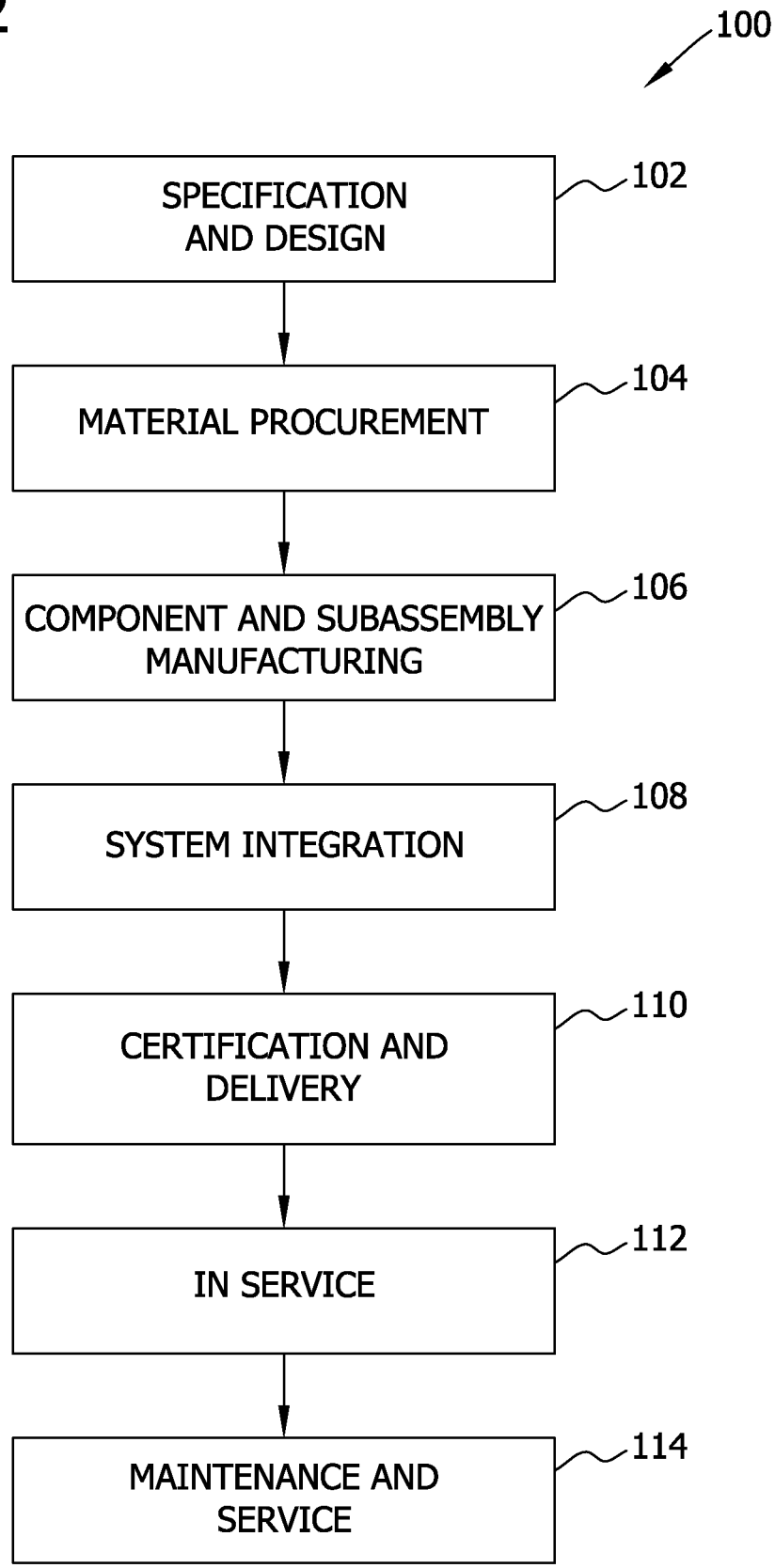

FIG. 7

```
┌─────────────────────────┐
│          ADO            │
├─────────────────────────┤
│ Aca : Aca               │
│ Access : Boolean        │
│ Feature : Feature       │
│ CreationDate : Date     │
│ Data : List             │
│ Description : String    │
│ Dirty : Boolean         │
│ Group : String          │
│ Keyword : List          │
│ Mapper : Mapper         │
│ ModifiedDate : Date     │
│ Name : String           │
│ Owner : String          │
│ Product : String        │
│ Project : String        │
│ Results : Results       │
│ Status : String         │
│ Version : String        │
│ Image : Image           │
└─────────────────────────┘
```
— 500

FIG. 8

```
┌─────────────────────────┐
│          ACA            │
├─────────────────────────┤
│ ADOList : List of ADOs  │
│ Access : Boolean        │
│ CreationDate : Date     │
│ Description : String    │
│ Dirty : Boolean         │
│ Group : String          │
│ Keyword : List          │
│ ModifiedDate : Date     │
│ Name : String           │
│ Owner : String          │
│ Product : String        │
│ Project : String        │
│ Status : String         │
│ Version : String        │
│ Image : Image           │
└─────────────────────────┘
```
— 550

FIG. 9

```
         Feature
┌──────────────────────────┐
│ FeatureName : String     │──── 600
│ FeaturePath : String     │
│ PartName : String        │
└──────────────────────────┘
```

FIG. 10

```
            Data
┌──────────────────────────┐
│ ADO : ADO                │──── 650
│ Dirty : Boolean          │
│ Feature : Feature        │
│ Name : String            │
│ Purpose : String         │
│ Type : String            │
│ Units : String           │
│ Value : String           │
└──────────────────────────┘
```

FIG. 11

```
            Source
┌──────────────────────────────┐
│ Source : String              │──── 700
│ SourceCreationDate : Date    │
│ SourceDatabase : String      │
│ SourceLocation : String      │
│ SourceOverride : Boolean     │
│ SourceType : String          │
└──────────────────────────────┘
```

DAI System | Analysis Data Object Properties

| Analysis | Notes | Search |

Analysis: Buckling Analysis P. Body.S401
Owner: 12345678

- P. Body.S401
  - Buckling Analysis
    - Bay1A
    - Bay2A
    - Bay3A
    - Bay1B
      - Analysis
      - Data Input
      - Data Output
    - Bay2B
    - Bay3B Name: Bay1B
Program: 787
Project: 787
Status: Open
Version: 1
Owner: 87654321
Created: Thursday,March 03,2011,12:00:00 PM
Modified: Thursday,March 03,2011,12:00:00 PM
Keywords:
Description:
Lorem ipsum dolor sit amet consectetur adipiscing elit. Vivamus mollis ultrices molestie. Etiam eleifand, sapien a venenatis malesuada, lectus augue semper ipsum, non tristique mauris eros sit amet nunc. Etiam orci lectus.

[Save]

Published: No
Created: Thursday,March 03,2011,12:00:00 PM
Modified: Thursday,March 03,2011,12:00:00 PM

FIG. 18

DAI System | Analysis Data Object Inputs    — 1050

Analysis | Notes | Search

Analysis: Buckling Analysis P. Body.S401
Owner: 12345678

- P. Body.S401
  - Buckling Analysis
    - Bay1A
    - Bay2A
    - Bay3A
    - Bay1B
      - Analysis
      - Data Input
      - Data Output
    - Bay2B
    - Bay3B

| Item | Type | Value | Units | Description |
|------|------|-------|-------|-------------|
| W | Real | | Inches | Width of Panel |
| T | Real | | Inches | Thickness of Panel |
| H | Real | | Inches | Height of Panel |

Item: Density
Type: Real
Units: lb/ft3
Value: 2.72
Description: Density of aluminum panel

[Add]

Feature: P. Body.S401.Bay.Bay1B
Source: External Geometry Database

[Import]

[Save]

Published: No
Created: Thursday, March 03, 2011, 12:00:00 PM
Modified: Thursday, March 03, 2011, 12:00:00 PM

DAI System | Analysis Data Object Outputs

| Analysis | Notes | Search |

Analysis: Buckling Analysis P. Body.S401
Owner: 12345678

- P. Body.S401
  - Buckling Analysis
    - Bay1A
    - Bay2A
    - Bay3A
    - Bay1B
      - Analysis
      - Data Input
      - Data Output
    - Bay2B
    - Bay3B

| Item | Type | Value | Units | Description |
|------|------|-------|-------|-------------|
| Margin | Real | | | Margin of Safety |
| | | | | |

Item: [          ]

Type: [          ▽]

Units: [          ▽]

Description: [          ]

[ Add ]

[ Save ]

Published: No
Created: Thursday, March 03, 2011, 12:00:00 PM
Modified: Thursday, March 03, 2011, 12:00:00 PM

DAI System | Analysis Notes Object Note

| Analysis | Notes | Search |

Analysis: Buckling Analysis P. Body.S401
Owner: 12345678

- P. Body.S401
  - Buckling Analysis
    - Bay1A
    - Bay2A
    - Bay3A
    - Bay1B
      - Note 1
      - Note 2
    - Bay2B
    - Bay3B Annotation:

Lorem ipsum dolor sit amet consectetur adipiscing elit. Vivamus mollis ultrices molestie. Etiam eleifand, sapien a venenatis malesuada, lectus augue semper ipsum, non tristique mauris eros sit amet nunc. Etiam orci lectus, gravida nec ullamcorper sed, condimentum et adio. Praesent facilisis dapibus sem, vel semper erat porta as. Cras eleifend libero at nisi faucibus consectetur.

Nam et arcu in urna feugiat sodales. Proin ac arcu ac elit gravida convallis. Duis fermentum pellentesque hendrerit, Curabitur adipiscing interdum enim quis fermentum. Vivamus id lectus eget tellus interdum vehicula, Vestibulum Include:

| Standard Analysis Annotations |
|---|
| ☑ Boilerplate 1 |
| ☐ Boilerplate 2 |

[ Save ]

Published: No
Created: Thursday,March 03,2011,12:00:00 PM
Modified: Thursday,March 03,2011,12:00:00 PM

FIG. 27

```
<Aca>
    <access>true</access>
    <name>P. Body.S401</name>
    <program>787</program>
    <project>787</project>
    <status>Open</status>
    <adoList>
        <Ado>
            <access>true</access>
            <analysis>
                <analysisType>Buckling Check</analysisType>
                <analysisTool>Buckling Analysis Application</analysisTool>
            </analysis>
            <creationDate>Thursday, March 03, 2011, 12:00:000 PM</creationDate>
            <dataList>
                <Data>
                    <name>height</name>
                    <value>10</value>
                    <units>inches</units>
                </Data>
                <Data>
                    <name>width</name>
                    <value>20</value>
                    <units>inches</units>
                </Data>
                <Data>
                    <name>Margin</name>
                    <value>7.22050725016e-4</value>
                    <units>-</units>
                </Data>
            </dataList>
            <description>Lorem ipsum dolor sit amet consectetur adipiscing elit. Vivamus mollis ultrices molestie. Etiam eleifand, sapien a venenatis malesuada, lectus augue semper ipsum, non tristique mauris eros sit amet nunc. Etiam orci lectus.</description>
        </Ado>
    </adoList>
</Aca>
```

| Validation Report | |
|---|---|
| Title | P. Body.S401 |
| Description | Lorem ipsum dolor sit amet, consectetur adipiscing elit. Vivamus mollis ultrices molestie. Etiam eleifand, sapien a |
| Project | 787 |
| Product | 787 |
| Owner | 12345678 |
| Status | Open |
| Version | 1 |
| | |

| Property | Bay1A | Bay2A | Bay3A | Bay1B | Bay2B | Bay3B |
|---|---|---|---|---|---|---|
| Height | 10 | 20 | 30 | 40 | 50 | 60 |
| Width | 10 | 20 | 30 | 40 | 50 | 60 |
| Margin | 0.00072 | 0.00014 | 1.1E-05 | -0.0005 | 0.00021 | 0.03337 |

SYSTEMS AND METHODS FOR CREATING INTUITIVE CONTEXT FOR ANALYSIS DATA

BACKGROUND

The field of the disclosure relates generally to data management, and more specifically, to systems and methods for creating intuitive context for analysis data.

Product design, analysis and validation contribute significant time and cost to the lifecycle of aircraft development as well as an amount of risk. Incorrect assumptions in engineering data and calculations can lead to unanticipated changes, rework and support costs, in varying degrees, in all stages of the development lifecycle as well as the product lifecycle. In addition, at least some engineering data are not considered valuable in-and-of-itself, and are traditionally treated as byproducts, in some cases simply discarded. Engineering data can be volatile, existing temporally for brief periods—as in intermediate calculations that are not correctly documented; or persistent, thereby existing for significant periods of time. Data may also exist globally—shared and persisted across a broad range of stakeholders for the life of the product, or locally, relevant only to the private calculations performed by an engineer.

Essentially, the various forms of engineering data each have a lifecycle of its own, and managing this data provides strategic and competitive advantages that should not be overlooked. Effectively managing the data lifecycle also offers the potential of mitigating the risk posed to overall product lifecycle.

Commercial analysis data management (ADM) systems provide data management, versioning, and persistence, but this data management occurs at the document/file level, which typically limits and controls exposure to the embedded engineering data, sometimes leading to piecemeal validation of analysis data. In one view, ADMs exist only to organize systems of files and automate file-driven processes, and therefore fall short of a capability to manage and exploit engineering data at a granular level (i.e. name-value pairs, attributes and/or properties), and associated metadata, for long periods of time.

Compounding the above, ADM vendors also provide no guarantee of the availability of their services and tools as may be required, for example, over the decades of an expected product lifecycle. ADM tools that consume, interpret, annotate, and persist engineering data do not guarantee a capability to reconstitute data over time (read: decades) as may be required. Further, the data generated through these ADM tools may be in a proprietary format. In such a scenario, valuable data and/or context for the data might be found in the meta-data that is generated by the ADM tools. However, such meta-data is generally not provided as an output of the ADM tool, at least not in a fashion that it might be accessed at a point further down a product lifecycle.

Further, data persisted in vendor file formats only have value when paired with the application that produced it, or by those applications or systems that are sanctioned by the vendor. Therefore, to utilize file-based ADM data in associated application it is often necessary to duplicate, recreate, or extract and transform data using single-purpose transient programmatic efforts, thereby producing orphan data sources. Efforts to manage the data association are intractable since granular access to the ADM data is not allowed.

Interrogating ADM systems for contextualized data (e.g. hierarchical model data) is limited to the capabilities of the ADM system. Each ADM approaches the management of data, and its context—if available—in unique ways and are generally not designed to be accessed or queried outside of the native applications. In a relevant example, aircraft may be used for 50 to 100 years and hence there is a need to have the data needed for future analysis persist for extended periods of time.

BRIEF DESCRIPTION

In one aspect, one or more computer-readable storage media having computer-executable instructions embodied thereon are provided. Wherein when executed by at least one processor, the computer-executable instructions cause the at least one processor to define an analysis and an analysis data object related to a part, data for an analysis of the part at least partially available from a plurality of disparate applications related to the design, fabrication and testing of the part, verify that all the data needed for the analysis, as defined within the analysis data object, is available from at least one source of data, invoke an analysis of the part upon receipt of all of the data needed for the analysis, the analysis results populating the analysis data object, and storing the analysis data object such that the analysis results therein occur in a format unrelated to any of the applications that generated data used in the analysis.

In another aspect, a system for design and analysis integration is provided. The system includes a processing device, a memory communicatively coupled to the processing device, a user interface communicatively coupled to the processing device, and at least one communications interface communicatively coupled to the processing device. The processing device is programmed to define an analysis to be associated with an analysis data object (ADO), establish data inputs and data outputs dictated by the defined analysis, obtain, via said at least one communications interface and said user interface, at least one of user inputs and data inputs from one or more sources, invoke the defined analysis associated with the ADO after verifying all data inputs are available, and populate, in an application independent format, the ADO with the verified data inputs, data outputs from the analysis, and the analysis definition.

In still another aspect, a method for integrating design and analysis features and context metadata into persistent data is provided. The method includes defining an analysis to be associated with an analysis data object (ADO), establishing data inputs and data outputs dictated by the defined analysis, obtaining at least one of user inputs and data inputs from one or more sources based on the established data inputs, verifying all the established data inputs have been obtained, and populating the ADO with the verified data inputs, data outputs generated from the analysis, and the analysis definition.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 2 is a flow diagram of an aircraft production and service methodology.

FIG. 7 is a table illustrating an analysis data object (ADO) entity description.

FIG. 8 is a table illustrating an analysis context aggregator (ACA) entity description.

FIG. 9 is a table illustrating a feature object entity description.

FIG. 10 is a table illustrating data object entity descriptions.

FIG. 11 is a table illustrating a source class diagram description.

FIG. 16 is an example user interface for the DAI system in which the user defines the properties relating to the analysis data object.

FIG. 18 is an example user interface for the DAI system in which the user identifies, or imports from an external data service, the properties relating to the data inputs required of the analysis data object.

FIG. 19 is an example user interface for the DAI system in which the user identifies the properties relating to the data outputs to be expected from the analysis data object.

FIG. 20 is an example user interface for the DAI system in which the user inputs free-form text and images.

FIG. 27 is an example XML document that archives analysis object attributes and behaviors.

FIG. 28 is an example of a published validation report.

DETAILED DESCRIPTION

Figure 1A:
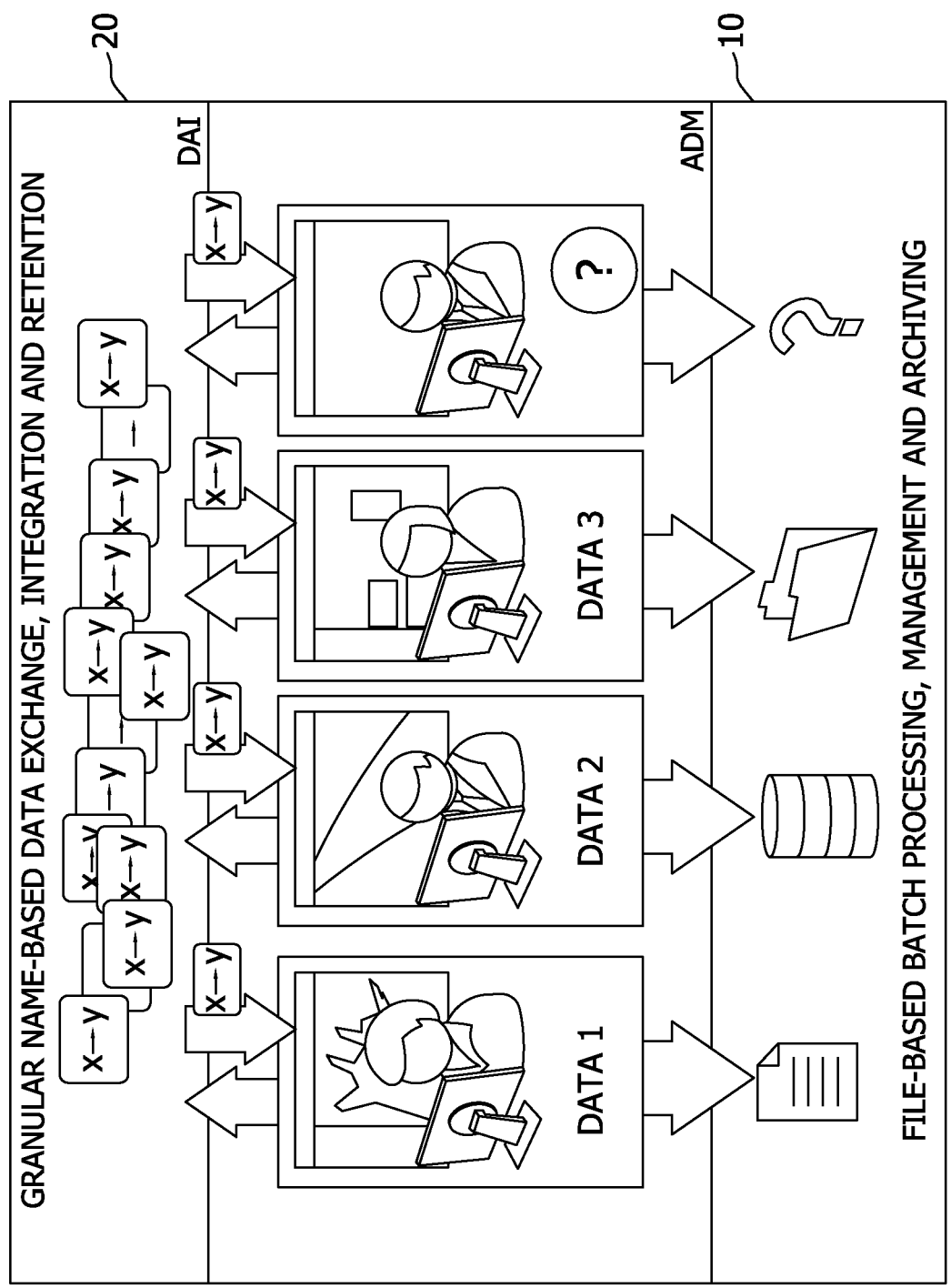
FIG. 1A is a diagram comparing an analysis data management (ADM) process to design analysis integration (DAI) process.

To address the shortcomings described above, systems and methods are described herein that can coexist with Analysis Data Management (ADM) systems but natively offer the capabilities not provided by current ADMs. The described embodiments address the need for application independent data retention such that all the data needed to perform an analysis can be accessed regardless of the format in which the data was originally generated. Referred to herein as design analysis integration (DAI), such systems and methods exploit, for example, engineering data at a granular level, persisting name-value pairs along with contextual information such as originating source, associations, and required transformations. As an example, a structural part for an aircraft may have data associated therewith from a number of disparate applications, including geometric data, material properties, loading data, and data related to the physics of part operation. It useful to take the data from the disparate data sources, arrange the data, and store the data in such a way that the context of the data persists regardless of the how, or by what engineering application, it was created.

As used herein, contextual data covers data such as: who did the analysis, when did they do the analysis, what is the analysis that was performed and on what piece of structure was it performed. The described embodiments are directed to the capture of additional relevant information, for example, what assumptions were used, in what overall program process was the analysis executed, etc. Such parameters are different than the geometric parameters, loads information, and allowables (material properties) used as inputs to a structural analysis method and that method's output data. From a programming standpoint all of this data may be considered attributes to an analysis data object, as further described herein.

As further described, DAI integrates collaborating applications via programmatic interfaces, allowing real-time interoperation and access to data at the granular level. Data is persisted in a generic form that can be modified and managed by independent and external applications and processes, but are not tightly coupled to those applications and processes. The result is an agility that allows for the capture and management of data, for example engineering data, with contextual information, in a neutral, non-proprietary format. Another result is a single-source of data external to collaborating applications and systems, offering an ability to repurpose, transform, exploit, interrogate and integrate data in useful ways, further allowing for the long term availability and reconstruction of data, such as engineering and analysis data, within context.

The design analysis integration (DAI) embodiments described herein were formed to promote the capture, management and persistence of data separate from originating applications, processes and users. DAI emphasizes pervasive data persistence, as it favors time spans ranging from years to decades, so that analysis data at any point in time can be reconstituted to its original contextual format.

The necessity of the DAI approach is validated by a comparison with an Analysis Data Management (ADM) process. As FIG. 1A illustrates, ADM systems 10 provide analysis management, versioning and persistence, but these typically occur at the document/file level. Subsequent, introspection of a document is indigenous and limited, while external data access via application programming interfaces (APIs), if it exists, is limited to certain data constructs and not the entire pool of data the application persists. Additionally, the long term availability and reconstruction of the analysis, for example, over a span of decades cannot be guaranteed.

On the other hand, the DAI process 20 emphasizes granular data management relative to part features (the contextual level relevant to the engineer), allowing for the real-time data exchange among collaborating applications or systems, while natively offering access to this data. Further, data within the DAI systems are available to all authorized collaborating applications and users, and are persisted in a format that favors long-term persistence and facilitates analysis reconstitution.

DAI provides loosely coupled data, tools, and processes that operate at the contextual level required by the engineer to be efficient. Loosely coupled refers to the data as being application independent. DAI embodiments allow an engineer to be analysis feature centric rather than part centric; data centric rather than file centric; and engineering centric rather than application centric. To this end, because engineers ultimately size features of parts and not parts per se, DAI provides object representations of these part features, their necessary descriptive data, and their encompassing analysis, as manageable software business objects.

In describing and objectifying a feature's analysis and its supporting data and metadata, it is possible to reconstitute an analysis in the future with contemporary tools and processes that can properly interpret the data and execute the defined analysis. Because the data for an analysis is fully described at a higher abstract level apart from the software tools, it may be formatted and adapted to an analysis of the same ilk in the future.

The DAI approach includes the following new concepts. The scope of an analysis encompasses a single part feature object as opposed to the monolithic part as is traditionally done. An analysis data object represents an individual analysis that encapsulate all the inputs, outputs, and operations that produce the output. An analysis context aggregator collects and manages associated analysis data objects relevant to a part study, while also allowing for the publication of the collective analysis in various formats, as described in greater detail in the following paragraphs.

Figure 1B:
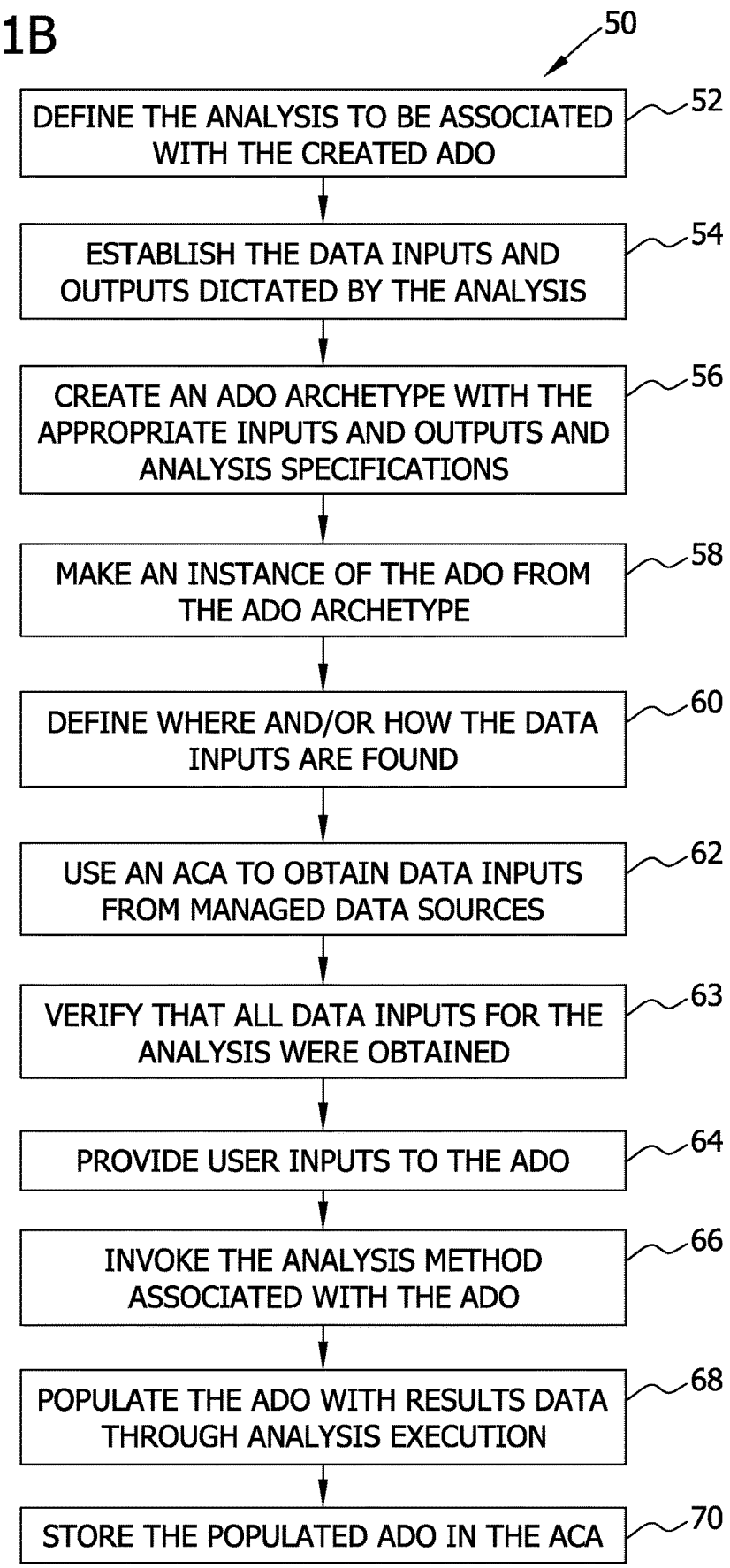
FIG. 1B is a flowchart illustrating creation and population of an analysis data object.

FIG. 1B is a flowchart 50 that provide an introduction to the described embodiments by illustrating creation and population of an analysis data object directed to a part feature, for example, a buckling analysis of an aircraft component. Via a user interface, or through an automated process, an analysis is defined 52 that will eventually be associated with an analysis data object (ADO). Data inputs and data outputs dictated by the defined 52 analysis are established 54. An ADO archetype is created 56 using the appropriate data inputs and data outputs (e.g., analysis results) as well as the analysis definition (e.g., control parameters used to exactly specify the options associated with the analysis method).

An instance of an ADO is made 58 based on the ADO archetype and it is determined 60 where and/or how the data inputs are found. An analysis context aggregator (ACA) is utilized to obtain 62 data inputs from one or more managed data sources, for example, the design, modeling and analysis applications mentioned herein. However, a verification 63 may be performed to ensure that all of the data needed for the analysis was able to be gathered from the sources of data prescribed for the individual ADO. If all of the data needed is not available from the defined data sources, a user may annotate the data via a user interface, or an alternative source of data may be accessed automatically. As one example, if it is determined that an ADO is missing certain required data, a similar ADO may be accessed to provide the needed data to complete the analysis.

Any needed user inputs, for example, either to enter missing data or to enter data that was intended to be gathered via user input, are provided 64 to the ADO and the analysis method associated with the ADO is invoked 66. Execution 68 of the analysis method populates the ADO with results data and the populated ADO is stored 70 in the ACA to provide application independent long term data retention.

As is described throughout this document, the data inputs may be "sourced" by a number of disparate sources, and any required data that cannot be recovered from the defined source, for example, due to a proprietary format, may be entered by a user or retrieved from another data source. Capturing this data within a single data object allows for the data to persist in an application independent format outside of the application through which the data was generated. As such, where and/or how data inputs are to be found is defined for the ADO and is either loaded into the ADO or the ADO is configured to receive "live" updates relating to the analysis, from one or more of the disparate applications.

As is understood by those skilled in the art, analysis data can be environment specific. ADO creation is further explained with respect to FIG. 6, described below. The data stored within the ADOs can be utilized for further analysis. For example, a portion of the data within the ADO can be applied as inputs to an algorithm which generates one or more outputs in the form of data. The definition of the ADO can be expanded to include such outputs. Analysis context aggregators (ACAs) are utilized to query a number of ADOs and operate to package results of the query for review.

Figure 3:
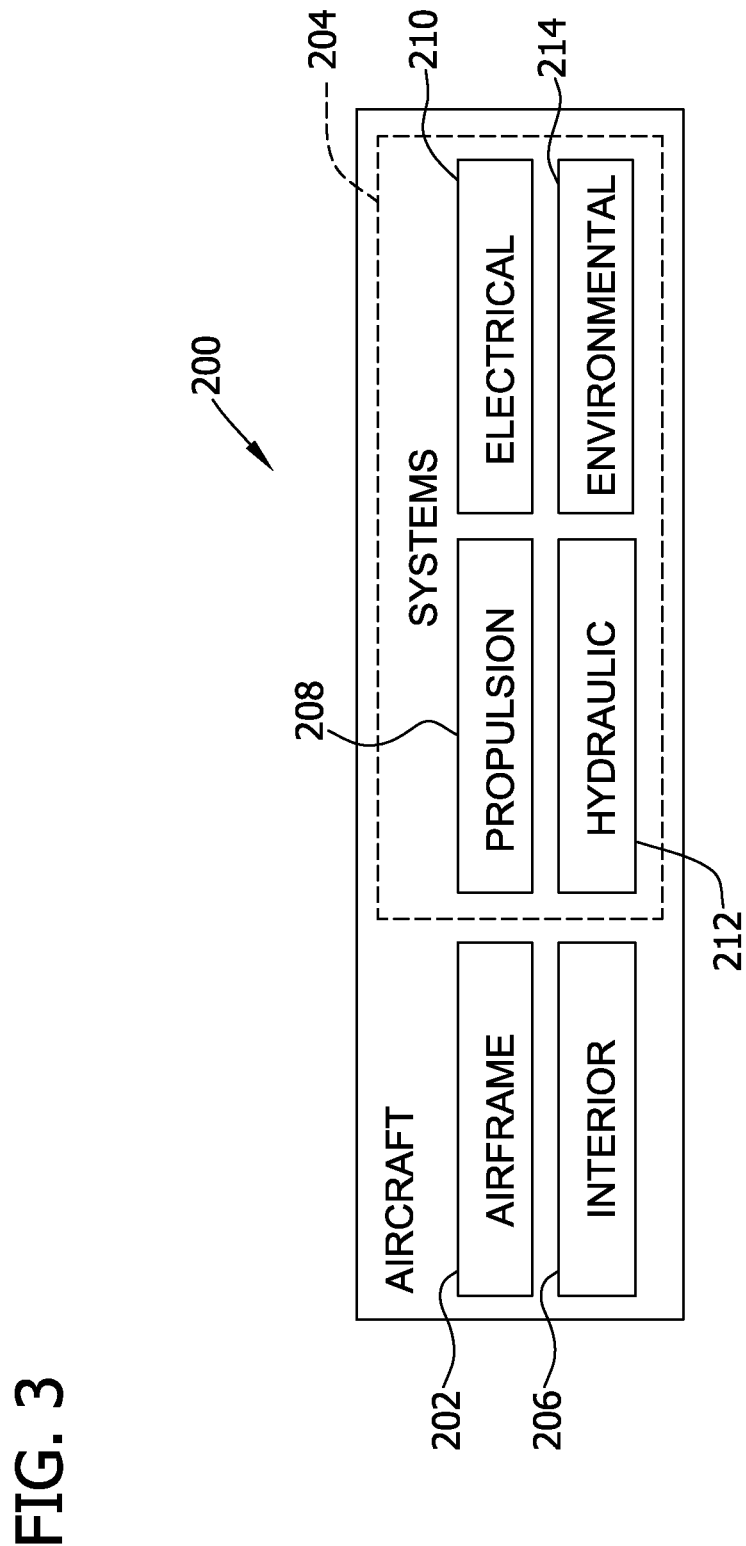
FIG. 3 is a block diagram of an aircraft.

Embodiments of the disclosure may be described in the context of aircraft manufacturing and service method 100 as shown in FIG. 2 and an aircraft 200 as shown in FIG. 3. During pre-production, aircraft manufacturing and service method 100 may include specification and design 102 of aircraft 200 and material procurement 104 which result in the generation of application specific data.

During production, component and subassembly manufacturing 106 and system integration 108 of aircraft 200 takes place. Certain test results for each aircraft are stored and may be needed for servicing or inspection after many years of aircraft service. Thereafter, aircraft 200 may go through certification and delivery 110 in order to be placed in service 112 which generates more data for long term storage, such data being generated by specific, and sometime proprietary applications. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 3, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 4:
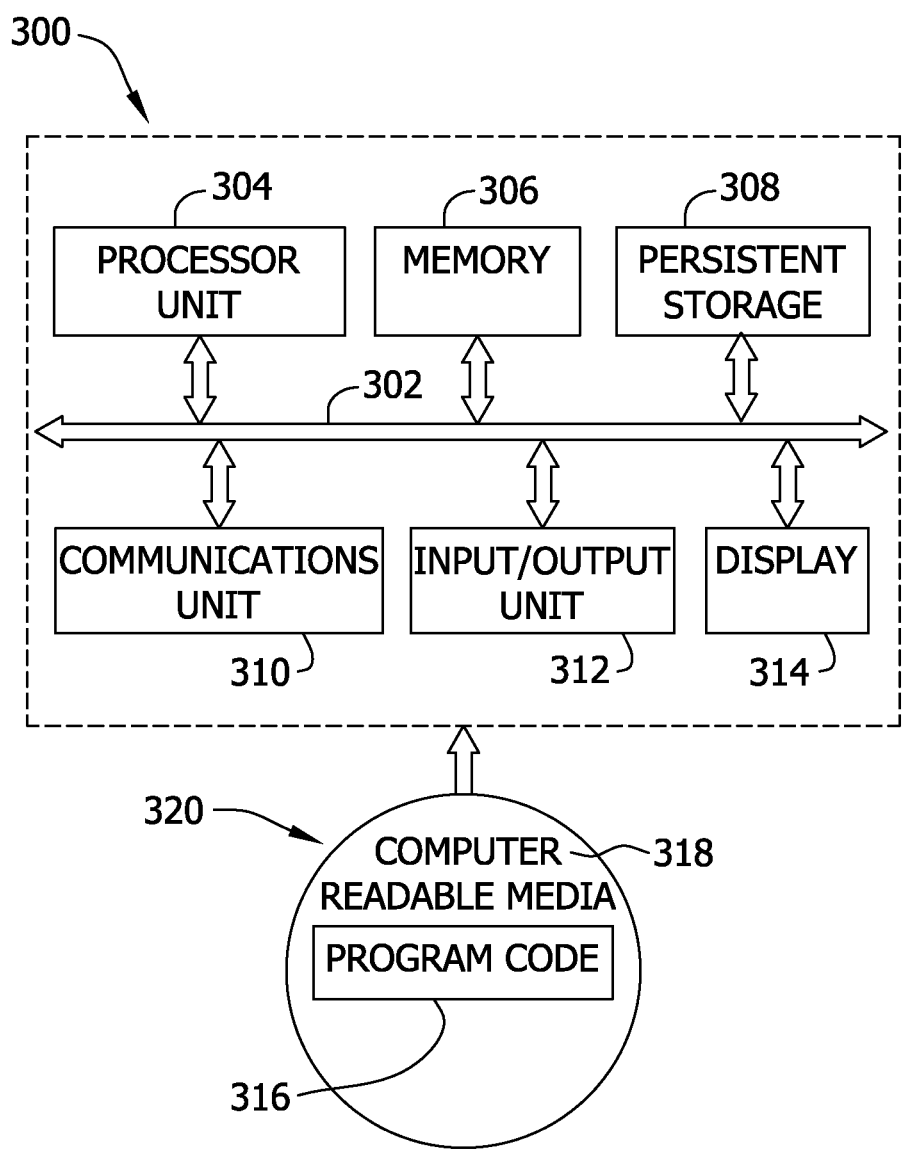
FIG. 4 is a diagram of a data processing system.

Turning now to FIG. 4, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 4 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

System Overview

DAI creates, groups, serves, and manages related sets of loosely coupled objects via a database or other storage mechanism that describe a part feature level analysis stored in various analysis data objects. These objects contain information (data) about the feature being analyzed (e.g., owner, date, ascribed part, requirements), the type of analysis, the required input and output data, links to an analysis engine, possible live link sources for data, analysis results, and descriptive and annotated images. There are also other objects and services to help execute, query, and manage these object structures.

Part Feature Object

Figure 5:
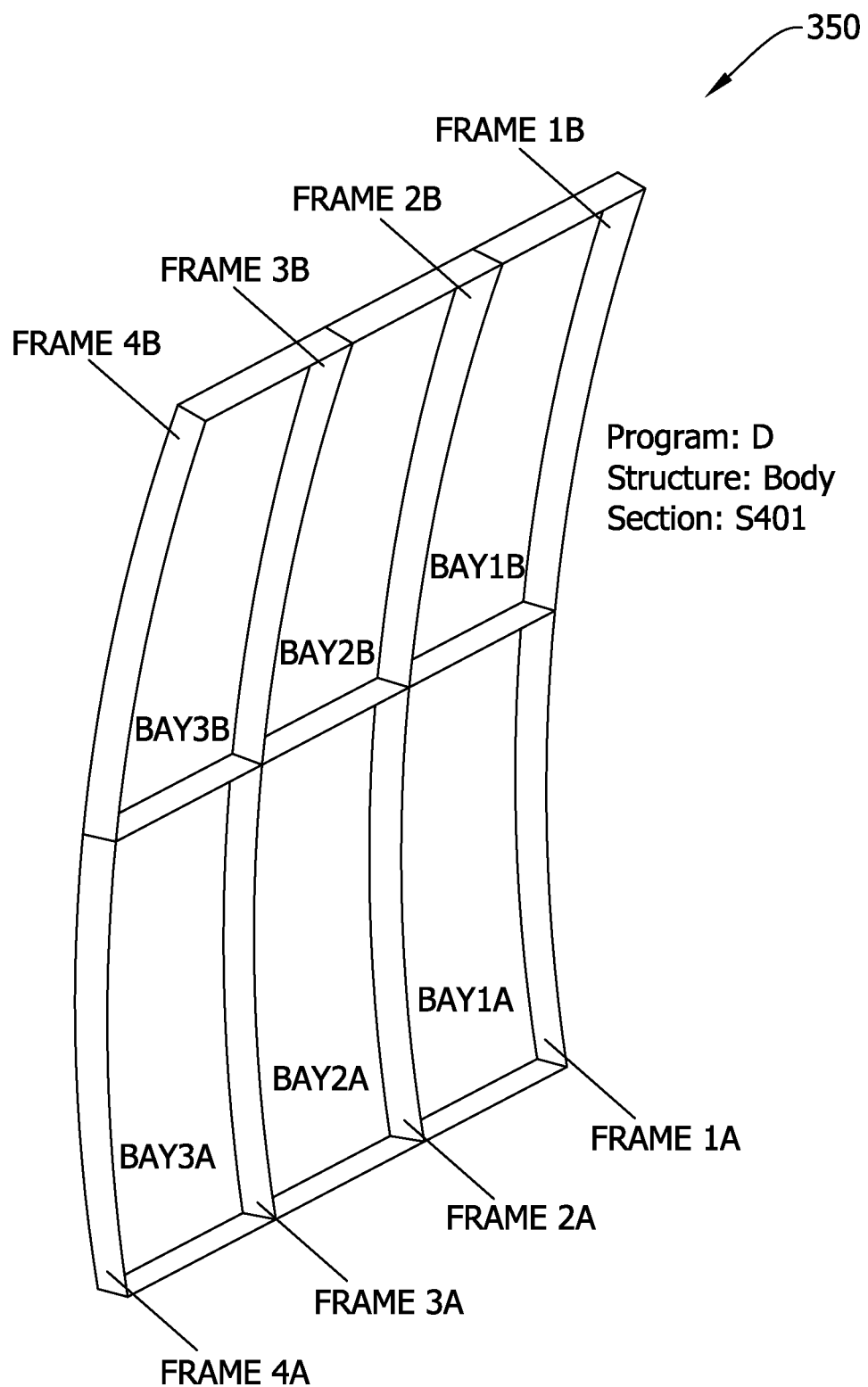
FIG. 5 is an illustration of a side of a body panel illustrating part feature objects which can be assigned a unique identifier.

Each feature object has a random unique identifier. The feature objects of the body panel 350 in FIG. 5 can be identified by the following, which are concatenated strings highlighting the hierarchical order of the specific feature.

P.Body.S401.Frame.Frame1A
P.Body.S401.Frame.Frame2A
P.Body.S401.Frame.Frame3A
P.Body.S401.Frame.Frame4A
P.Body.S401.Frame.Frame1B
P.Body.S401.Frame.Frame2B
P.Body.S401.Frame.Frame3B
P.Body.S401.Frame.Frame4B
P.Body.S401.Bay.Bay1A
P.Body.S401.Bay.Bay2A
P.Body.S401.Bay.Bay3A
P.Body.S401.Bay.Bay1B
P.Body.S401.Bay.Bay2B
P.Body.S401.Bay.Bay3B The identifiers can be user-generated or programmatically defined, and must be unique. Most importantly however, collaborating engineers from the design, analysis, and ancillary domains must agree to the nomenclature that is appropriate to the structure being developed, and this must be enforced for the lifecycle of the program.

Associated with the feature objects are properties that include attributes from the design and analysis domains. For example, the geometry model(s) may provide width, height, and thickness. From the analysis or finite element model, the following properties could be made available: element types, number of elements, number of nodes, maximum stress, and maximum strain. External data sources may also add material properties, critical loads and boundary conditions.

Analysis Data Objects (ADOs)

ADOs are smart containers (or software objects) that encapsulate the analysis pertaining to feature objects. For example, an ADO based on the identifier "P.Body.S401.Frame.Frame4B" can be expanded to include information related to one or more of a bending analysis, a buckling analysis, and a pull-off analysis. Further data objects, and their expansions, are generated for other frame members, bay members, and any other part for which information, such as analysis data is generated. For example, ADOs can be updated with new geometry, loads, and materials data, or they can be rerun to develop new sizing or margins of safety, the data object expanding as additional information relating to the part is generated. ADOs also retain the relationships of their inputs to their managed sources and the identities of the applied analysis methods, thus facilitating impact analysis when/if data or methods are later determined to have an error.

Generally, the ADO has attributes, and those attributes may include one or more of what the analysis is about, why the analysis was done, who did the analysis, what application(s) was (were) used (including version(s)), the analysis version, sensitivity of the analysis (Export Administration Regulations (EAR), International Traffic in Arms Regulations (ITAR)), status of analysis (public/private, life cycle state), input data names, values and pointers to their managed sources, and specifications of the analysis methods to perform, including control parameters. Other and additional attributes for ADO are contemplated and the above should be considered as example of information that might be contained within an ADO.

The ADO can invoke services and persist one or more of version information for the invoked methods, input names and values, output names and values, and analysis specifications. ADOs further include generic viewing methods for contained data (including context attributes and analysis information), such as list views, tree views, X-Y plots, and contour plots. ADOs further include data mapping and manipulation methods such as to receive data and convert parameter names, to perform data manipulation of inputs ahead of storage in the ADO, generic links to analysis methods, invocation of analysis services, and creation of an input file for existing applications.

The presence of the ADO therefore allows an engineer, for example, to focus on the overall analysis at hand, not on data management. Specifically, engineers do not have to concern themselves with the minutiae of the ADO, they just recognize the ADO as a preferred environment in which to work.

Analysis Context Aggregator

As ADOs proliferate, by user, and workgroup, it becomes necessary to manage these objects so as to prevent duplication of development effort, and to facilitate search. The analysis context aggregator (ACA) is the smart container that is tasked with this responsibility. The ACA is responsible for monitoring and tracking the ADOs related to a part analysis. To achieve this monitoring and tracking, the ACA assembles updates and caches views of the ADO attributes across the collective set of ADOs for which it has responsibility. For example, an ACA possesses the following views: ADOs by name, ADOs by status, ADOs by attributes, ADOs listed by context tree, input name list, input values, output name list, output values, as well as others that may be contemplated.

ACAs facilitate the interoperation of ADOs, obtaining the results or responses from a particular ADO that was queried by another. ACAs also provide the conduit to the services required by its set of ADOs. The ACA provides the ability to compare attribute values across ADOs, re-run a set of ADOs as opposed to individually, and assemble ADOs to produce a validation report. Achieving this flexibility, extensibility, and interoperability demands that the engineer keep an analysis (and therefore its ADO) discrete, directed to a singular purpose, and small, though the preferred small size is not a requirement.

Data and Analysis Services

The services managed by the ACA and accessed by ADOs are numerous, and potentially unlimited. Notable examples include Finite Element Analysis Data Management System (FEADMS), APARD (Analysis PARameter Database), which provide fixed responses to input data. Other services are required that will perform canonical analyses, such as buckling analysis, or the shear beam analysis, LEOTHA, and LESTAB.

Figure 6:
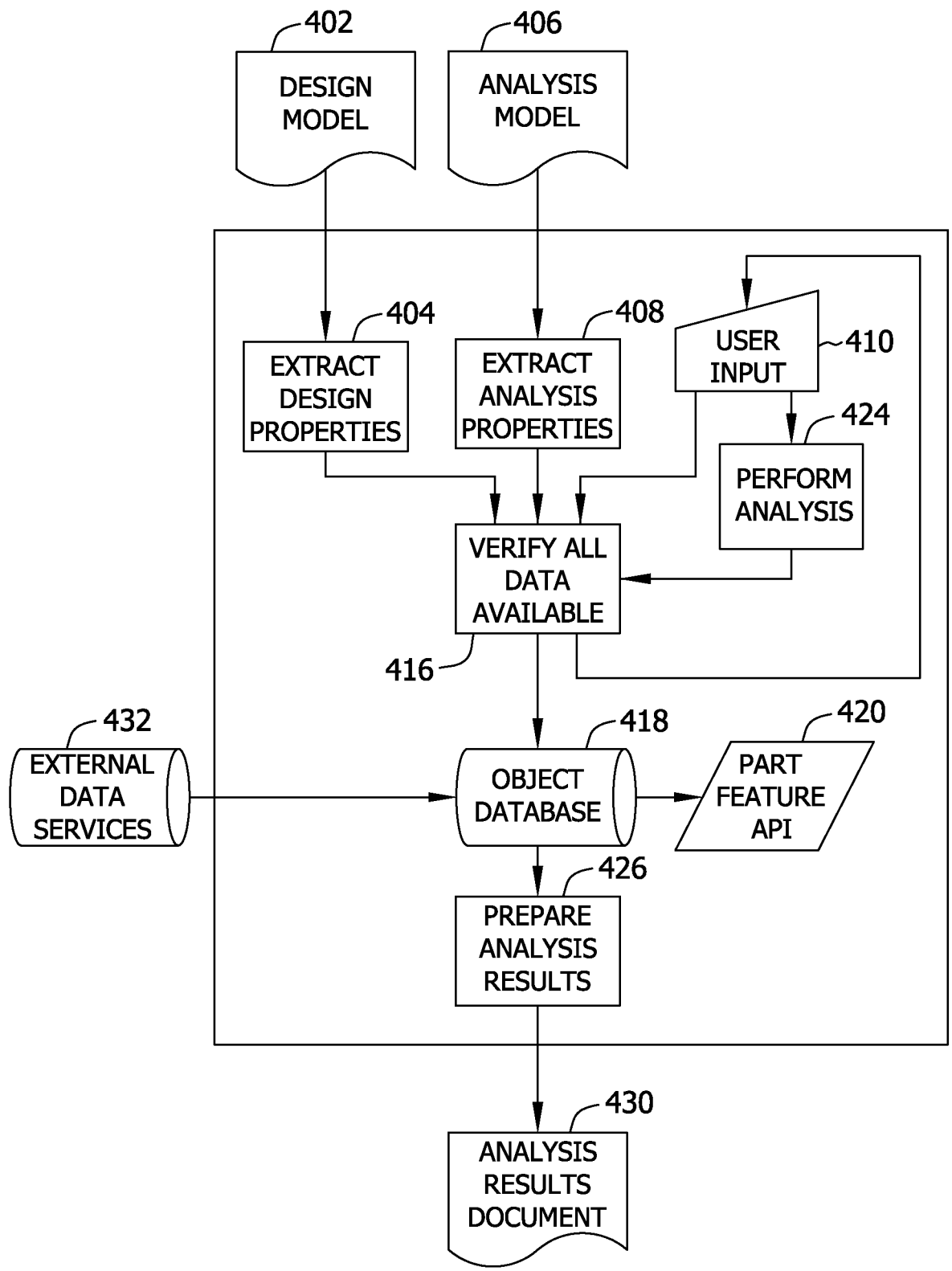
FIG. 6 is a functional description of a DAI system.

FIG. 6 is a functional description 400 of the DAI system. Functionally, the DAI system takes input from various engineering applications, analysis applications, and data sources and subsequently produces a document, or series of documents that represent the substantiating analysis required for structural certification. A design model(s) 402 is generally a three-dimensional (3D) geometric model as produced by 3D Computer-Aided Design (CAD) applications such as Dassault Systèmes CATIA or Siemens NX. The extent to which these applications can be integrated into the DAI system depends on the maturity of the APIs. With CATIA this is facilitated through the Component Object Model (COM) interface, which allows software programs developed in Visual Basic, Python, JAVA, and otherwise, access to connect and extract 404 model data (design properties).

In a similar manner the analysis model(s) 406 are generally a Finite Element Model (FEM) developed using Computer-Aided Engineering (CAE) tools. Data extracted (e.g., analysis properties) 408 from the application is made available via software programs (e.g. Visual Basic, Python, JAVA, etc). One contribution of the extraction programs (design property data extraction 404 and extracted analysis properties 408) is the organization of data relative to their containing feature object.

An object database 418 is an object-oriented database management system that is used to store all extracted model features as objects. In alternative embodiments, a relation database may be used for storage or the model features may be stored via XML. Each feature object is uniquely defined, and has properties corresponding to the key-value parameters that are generated by design property data extraction 404 and extracted analysis properties 408, and methods that expose and operate on these attributes. In a particular analysis, user inputs 410 may be required in addition to the design and analysis data. Prior to performing 424 the analysis, a verification 416 is utilized to determine whether or not all the data (design data, analysis data, and/or user input) needed for the analysis is available. If not, and in the example shown in FIG. 6, further user input 410 may be utilized to verify the complete set of data needed for the analysis is available. User input 422 allows user access to the system for the purposes of creating, preparing and managing data relative to an analysis. Typical inputs will include data related to the input models that are required such as file locations, user information, user name, role, and information related to the analysis that is being performed, program, and product, to provide a few examples.

A part feature API 420 exposes the feature objects of the object database via SQL, SOAP, XML and RESTful Web Services. Typically, these requests or queries are based on the feature object identifier. An analysis 424 is performed by executing an analysis, for example, one or more of a newly created analysis, or a rerun of an analysis with new, modified, or unmodified inputs and data and stored in the database 418. Analysis results 426 are prepared by aggregating all ADOs relative to a part analysis. An analysis results document 430 presents the analysis results in a human-readable, but machine verifiable format, and serves as the certification document or validation report.

External data services 432 are canonical data sources, web services, and/or standards that provide additional input data required by an analysis. Two notable examples are an Engineering Materials Data System (EMDS) and a Finite Element Analysis Data Management System (FEADMS).

FIG. 7 is a table 500 illustrating an ADO entity description. In the embodiment shown in FIG. 7, each ADO includes a unique ACA, essentially operating as a manager that monitors existence of the ADO, a feature property references the particular part feature object, a data property references the list of perceived first order (PFO) properties, and additional input and output properties, a mapper property that maintains the link between the original data source and the value in the PFO, an access feature, a creation date indicative of when the ADO was created, a description of the ADO, or analysis that the ADO performs, a modified Date indicative of when the ADO was last modified, a name of the ADO, an owner (the user that created the ADO, as well as other properties that describe the ADO.

FIG. 8 is a table 550 illustrating an ACA entity description. In the embodiment shown in FIG. 8, each ACA includes the list of ADOs that the ACA manages, access parameters, a creation date indicative of when the ADO was created, a description of the ADO, or analysis that the ADO performs, a modified date (when the ADO was last modified), the name of the ADO, the owner (the user that created the ADO) as well as other properties, including but not limited to, group, keyword, dirty, product, status, version, and image.

FIG. 9 is a table 600 illustrating a feature object entity description. In the embodiment shown in FIG. 9, each feature includes a FeatureName which is a user-defined name given to the feature, a FeaturePath which is the namespace that identifies the feature, and a PartName which is the name of the part that associated with the feature.

FIG. 10 is a table 650 illustrating a data object entity description. In the embodiment shown in FIG. 10, each data object includes an ADO which is the Analysis Data Object to which the data object belongs, a Boolean variable, a feature object to which the data object belongs, a name that is the name/identifier of the parameter the data object references, a purpose which is the intent of the data object, the parameter/attribute data type, the parameter/attribute unit of measurement, and the measure or quantity of the parameter/attribute.

FIG. 11 is a table 700 illustrating a source class diagram description. In the embodiment shown in FIG. 11, each source class includes a source which is a reference to the service to which the data object belongs, a source creation date, a source database, a source location, a source override, and a source type.

Figure 12:
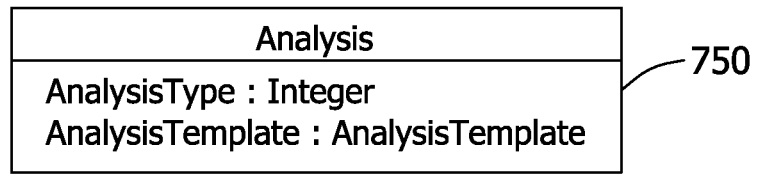
FIG. 12 is a table illustrating an analysis class diagram.

FIG. 12 is a table 750 illustrating an analysis class diagram. In the embodiment shown in FIG. 12, each analysis class includes an analysis type and an analysis template.

Figure 13:
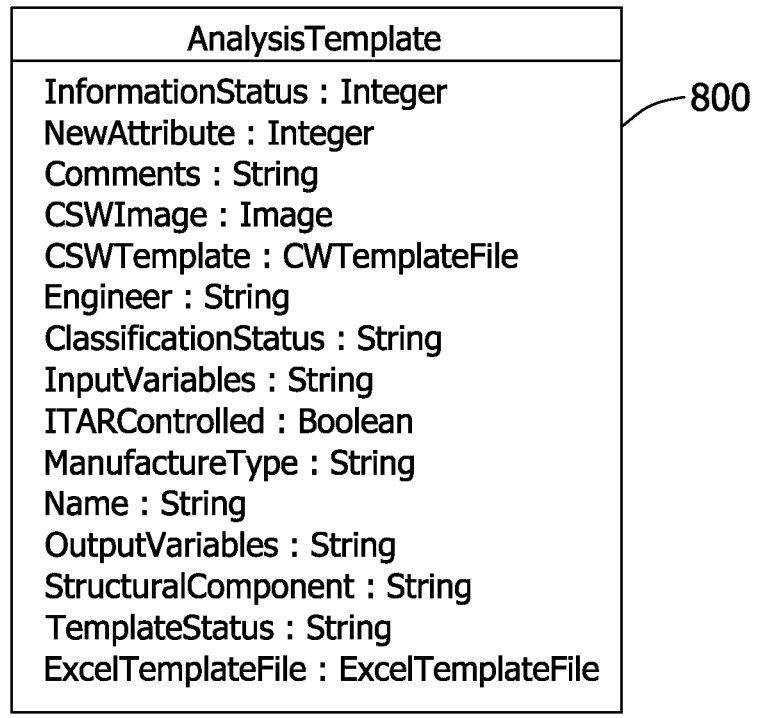
FIG. 13 is a table illustrating an analysis template class diagram.
Figure 14A:
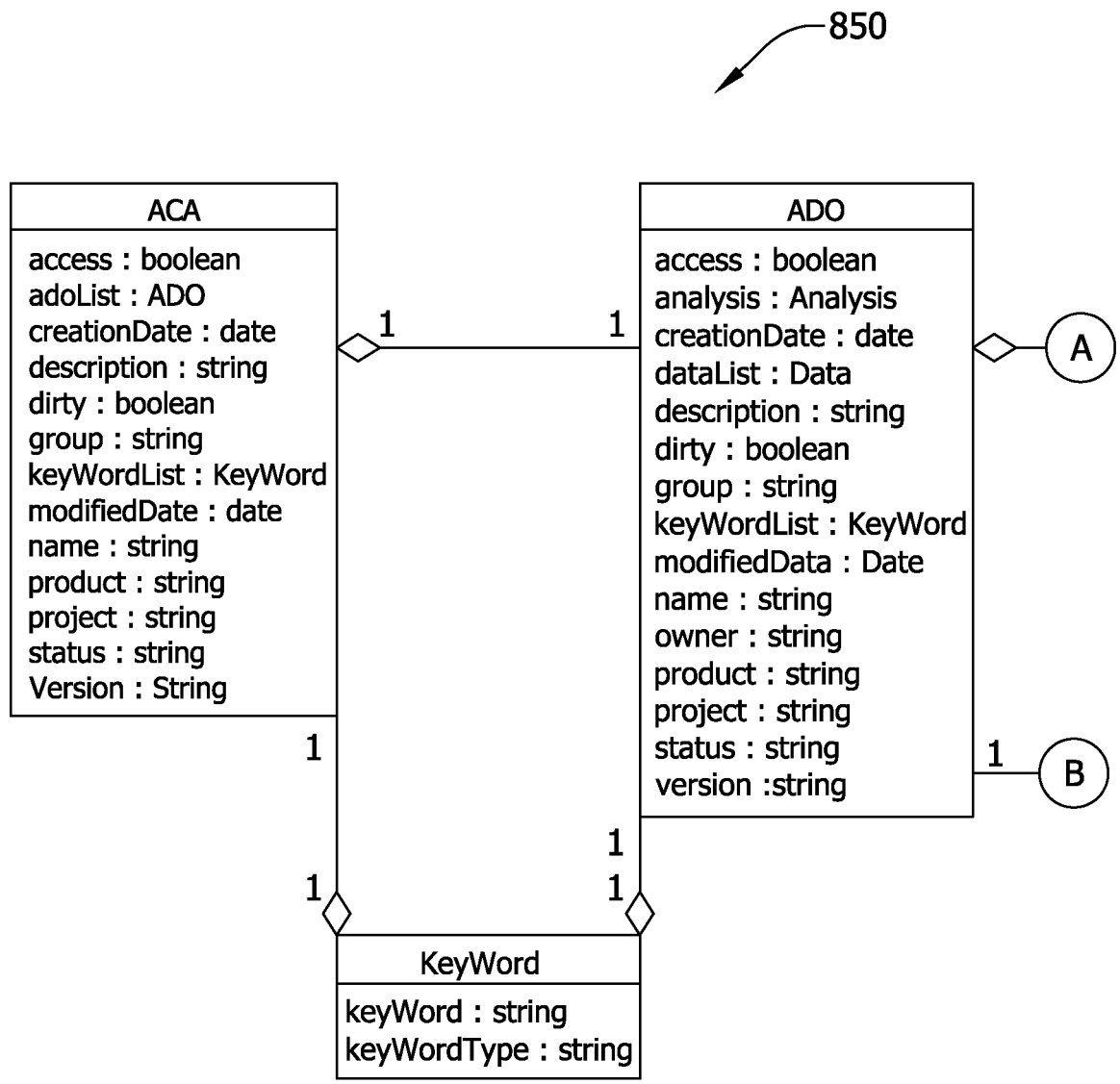
FIGS. 14A and 14 B are a class diagram of the DAI system.
Figure 14B:
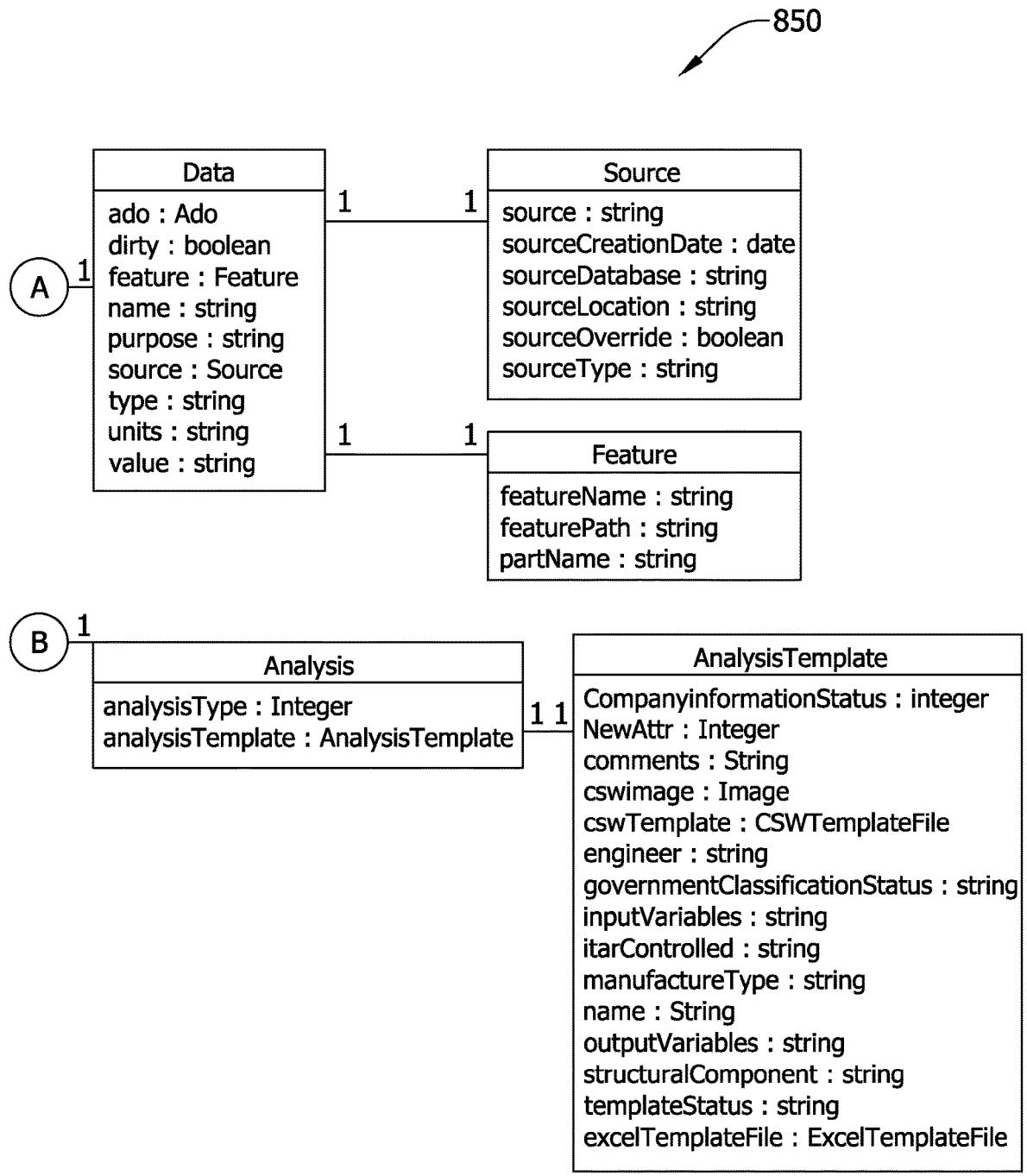

FIG. 13 is a table 800 illustrating an analysis template class diagram. In the embodiment shown in FIG. 13, each analysis template class includes information status, a new attribute, comments, a centralized software (CSW) image, a CSW template, an engineer, a classification status, input variables, ITAR control, a manufacture type, a name, output Variables, a structural component, a template status, and a template file. FIG. 14 is a class diagram 850 of the DAI system in which the descriptions of the preceding paragraphs are included.

EXAMPLE PROCESS

The following example illustrates a feature-level sizing of a data object within the DAI system and further illustrates the content of the tables described with respect to FIGS. 7-14 utilizing user interfaces. The problem description is as follows: panel sizing is to be performed for each of the six bays of the body panel 350 in FIG. 5. The analysis to be performed is a Buckling Check of each bay in body panel 350. For this example, the following data and metadata are captured within DAI objects for data persistence, reuse, querying, and reporting.

Figure 15:
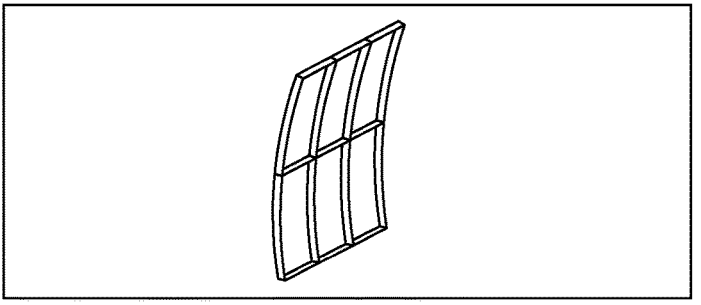
FIG. 15 is an example user interface for the DAI system in which the user defines properties relating to analysis context.

As defined above and used herein, a defined analysis context aggregator object is a data object that has properties, including and for example, part image, name, program, project, status, version, owner, created date, modified date, keywords, and/or description. These properties are embodiments that represent unique characteristics of the context in which the physical analysis occurs. FIG. 15 is an example user interface 900 for the DAI system in which the user defines the properties relating to the analysis context. The example of FIG. 15 is related to Body section S401 of a 787 aircraft. As shown, body section S401 includes Bays 1A, 2A, 3A, 1B, 2B, and 3B, each of which is defined using an analysis data object.

A defined analysis data object is a data object that has properties relative to a part feature, e.g. part image, name, program, project, status, version, owner, created date, modified date, keywords, and description. These are embodiments that represent unique characteristics of the physical analysis. The analysis data object accepts data inputs and following a transformation process produces user-specified data outputs. FIG. 16 is an example user interface 950 for the DAI system in which the user defines the properties relating to the analysis data object, for example Bay 1B as shown in the user interface 950.

Figure 17:
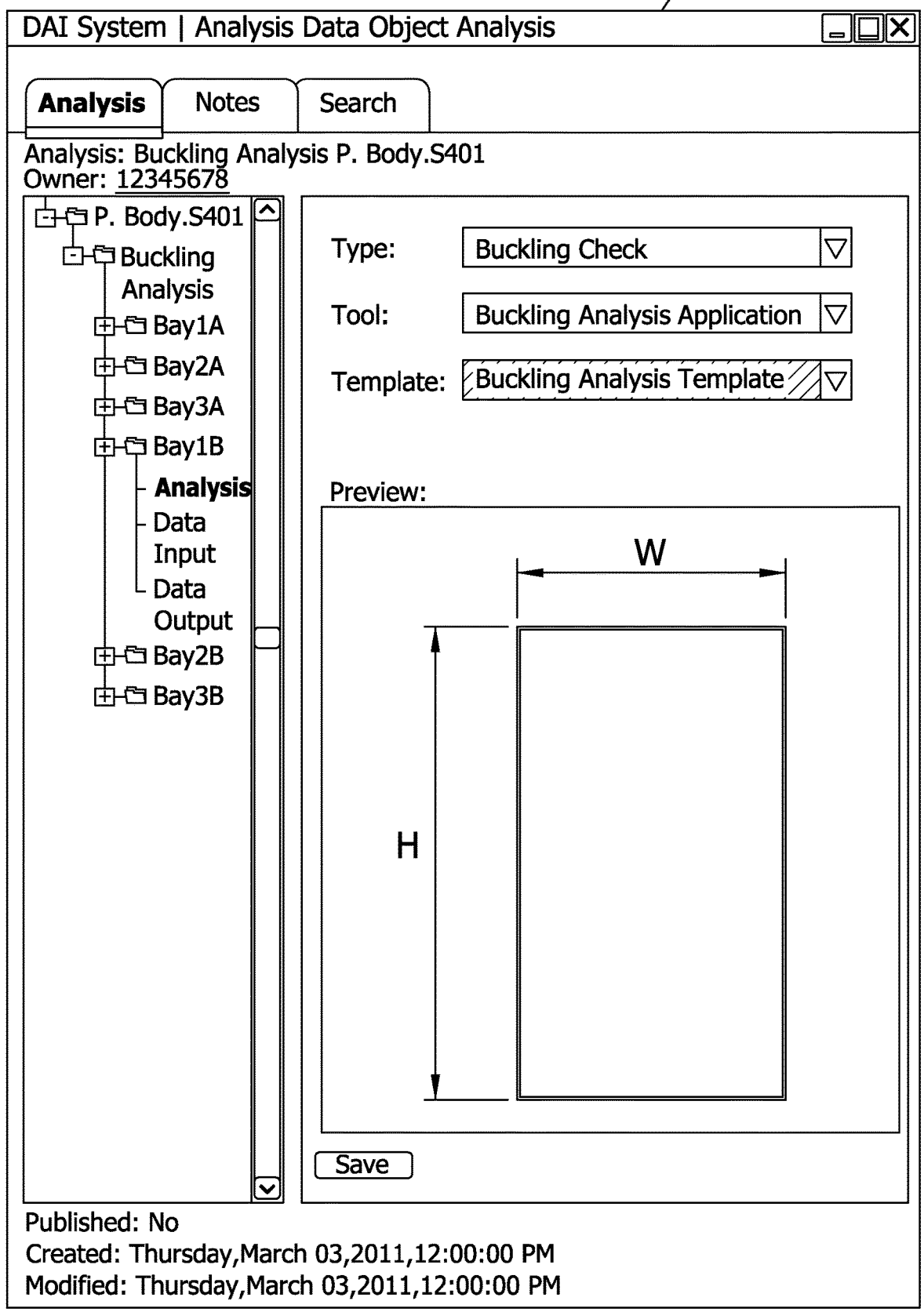
FIG. 17 is an example user interface for the DAI system in which the user identifies the properties relating to the analysis to be performed by the analysis data object.

FIG. 17 is an example user interface 1000 for the DAI system in which the user identifies the properties relating to the analysis to be performed by the analysis data object. User interface 1000 has properties directed to one or more of an analysis type (e.g., a buckling check), a coupled analysis service (e.g., buckling analysis software), and optional pre-defined templates determined by the analysis service. In the embodiment of FIG. 17, a buckling check analysis with regard to Bay 1B is illustrated.

FIG. 18 is an example user interface 1050 for the DAI system in which the user identifies, or imports from an external data service, the properties relating to the data inputs required for the analysis data object. Related to the buckling check analysis of FIG. 18, user interface 1050 has properties directed to one or more of required geometric data (e.g. Height—H, Width—W, Thickness—T), required material data (e.g. density), required physics data, and required loads data, or otherwise as contemplated by the user, for example, for Bay 1B. A source of the data is also shown as having been selected, for example, the source is denoted as being an "external geometry database".

FIG. 19 is an example user interface 1100 for the DAI system in which the user identifies the properties relating to the data outputs associated with the analysis data object. The example of FIG. 19 is directed to Bay 1B. Particularly, user interface 1100 has properties related to expected results data from a feature analysis, and may include margins of safety, and values of interest to the user (e.g. optimized values of H, W, T), or otherwise as contemplated by the user.

A defined Analysis Notes Object inherits the properties of an analysis data object, e.g. part image, name, program, project, status, version, owner, created date, modified date, keywords, and description. These are embodiments that represent unique characteristics of an analysis, but the notes object adds additional properties to clarify and justify actions performed in the analysis. The analysis notes object accepts free-form annotations and graphical images which are used to qualify the analysis defined by the analysis data object. FIG. 20 is an example user interface 1150 for the DAI system in which the user inputs free-form text and images, and has the option to include standard pre-defined analysis annotations. In the illustrated embodiment, user interface allows a user to input notes related to Bay 1B.

Figure 21:
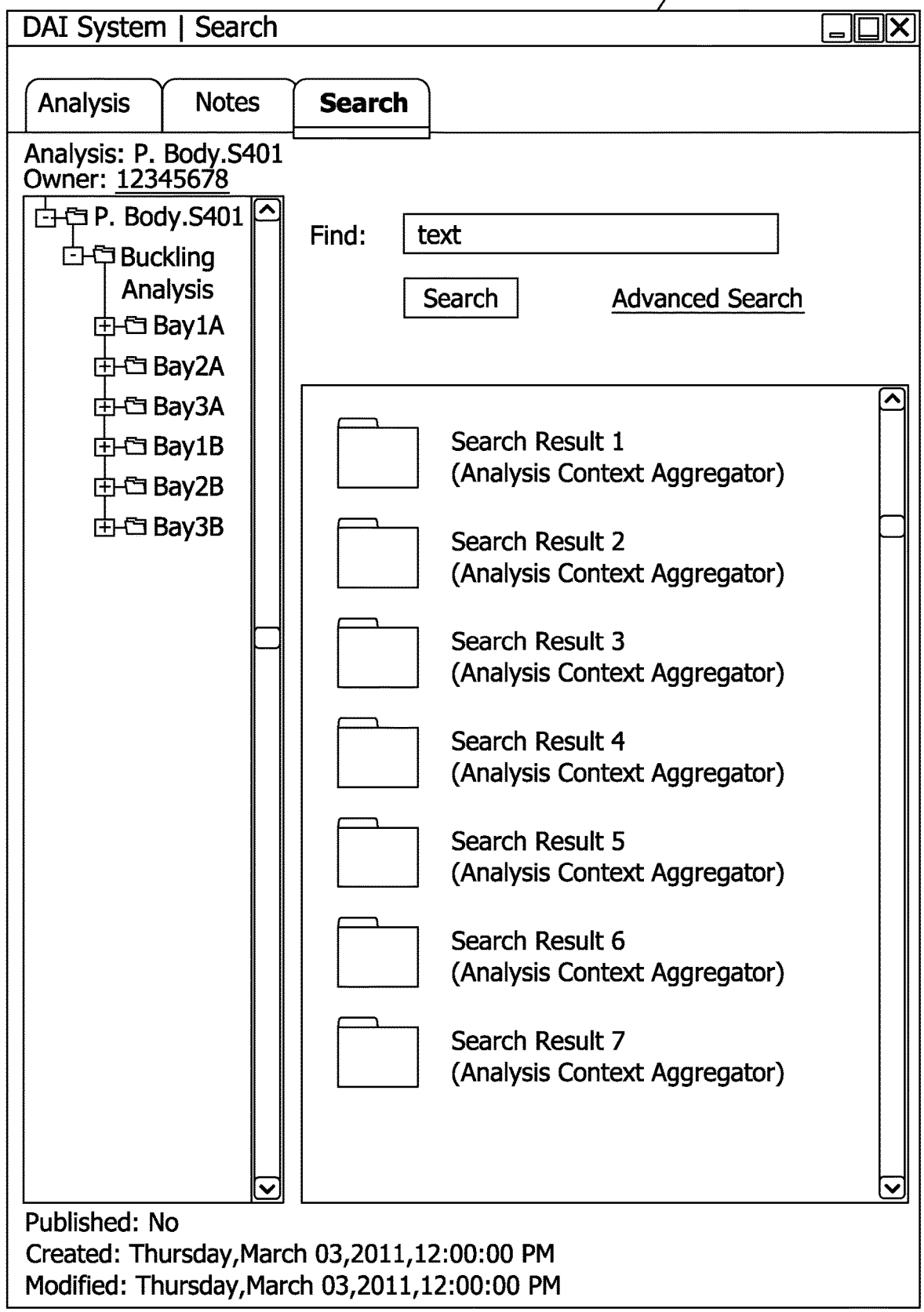
FIG. 21 is an example user interface for a search utility.
Figure 22:
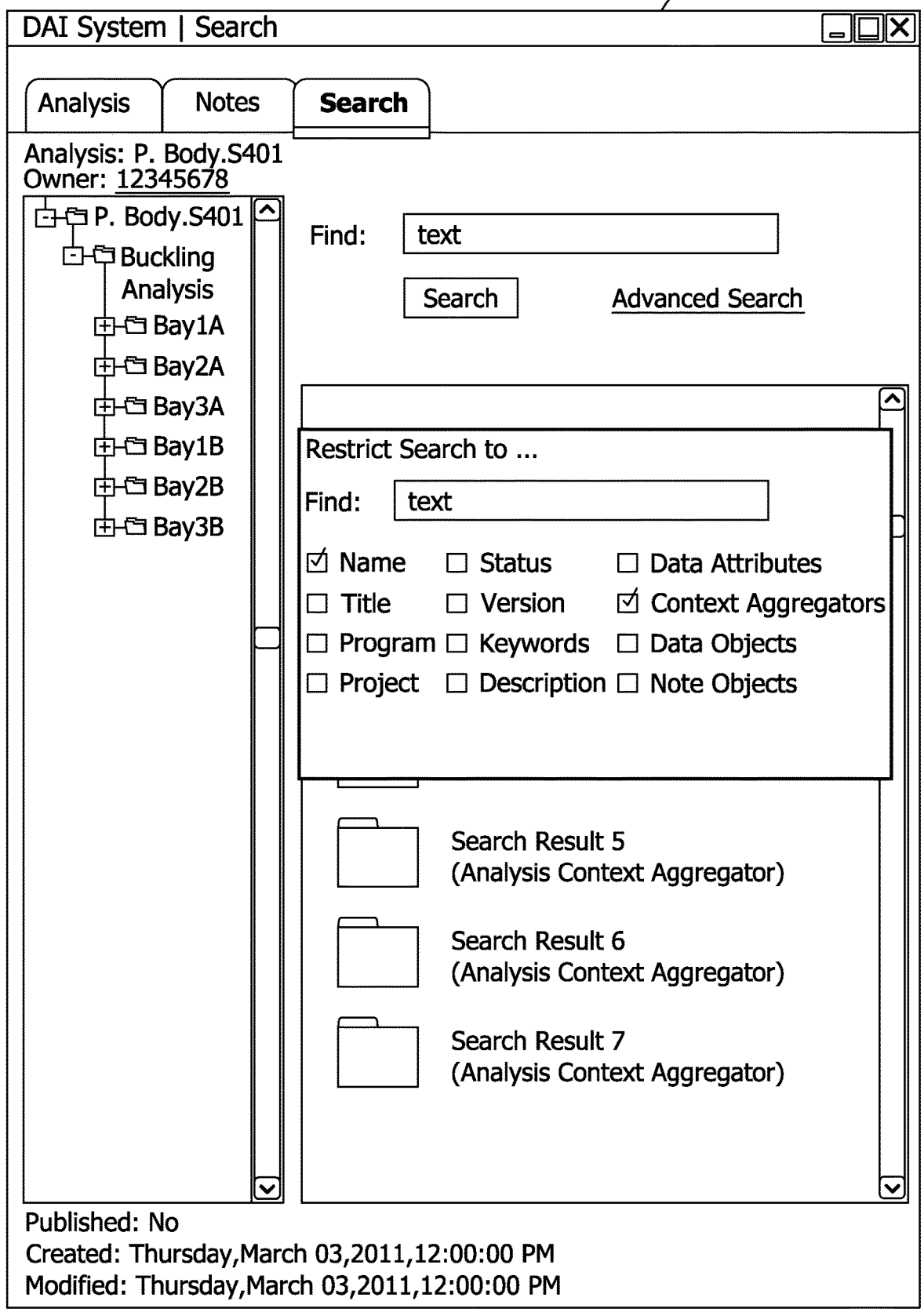
FIG. 22 is a first example user interface illustrating behavior of objects found using the search utility.
Figure 23:
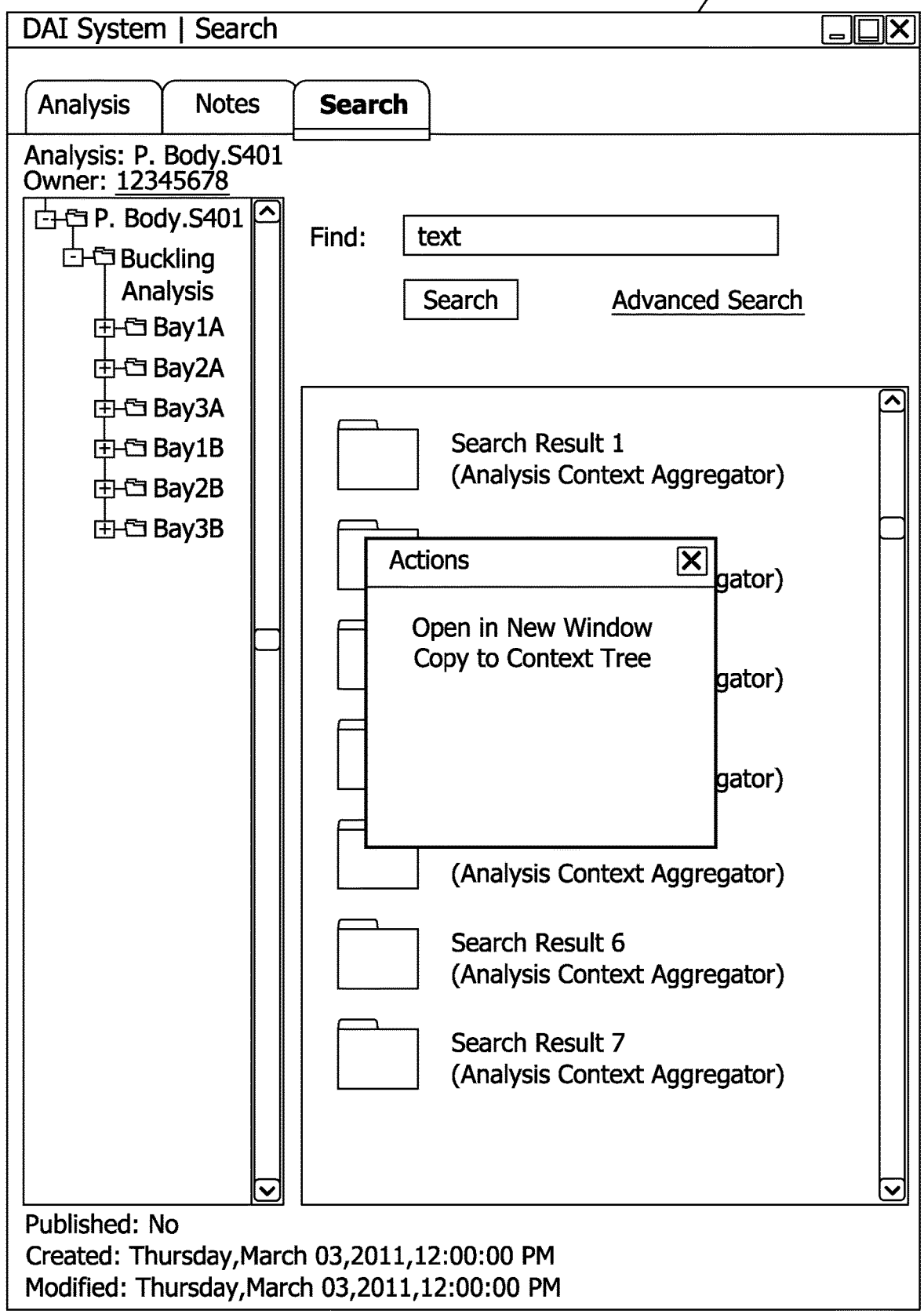
FIG. 23 is a second example user interface illustrating behavior of objects found using the search utility.

A search utility identifies analysis objects within the object database that has attributes that match the text specified in the search input field. FIG. 21 is an example user interface 1200 for the search utility, which performs a full-text search across all attributes of analysis objects, as specified by the user, including: name, program, project, status, version, owner, created date, modified date, keywords, description, and object type. FIG. 22 is an example user interface 1250 for the search utility that illustrates how to filter or restrict the results of the search. The results of the full-text search are analysis objects that can be acted upon in multiple ways. FIG. 23 is an example user interface 1300 respectively that illustrates the behavior of the objects found using the search utility. Analysis context aggregators can be imported as new entities to the context tree to be managed as a concurrent session, and analysis data objects can be imported as child objects to existing analysis context aggregators.

SEQUENCE OF OPERATIONS

Figure 24:
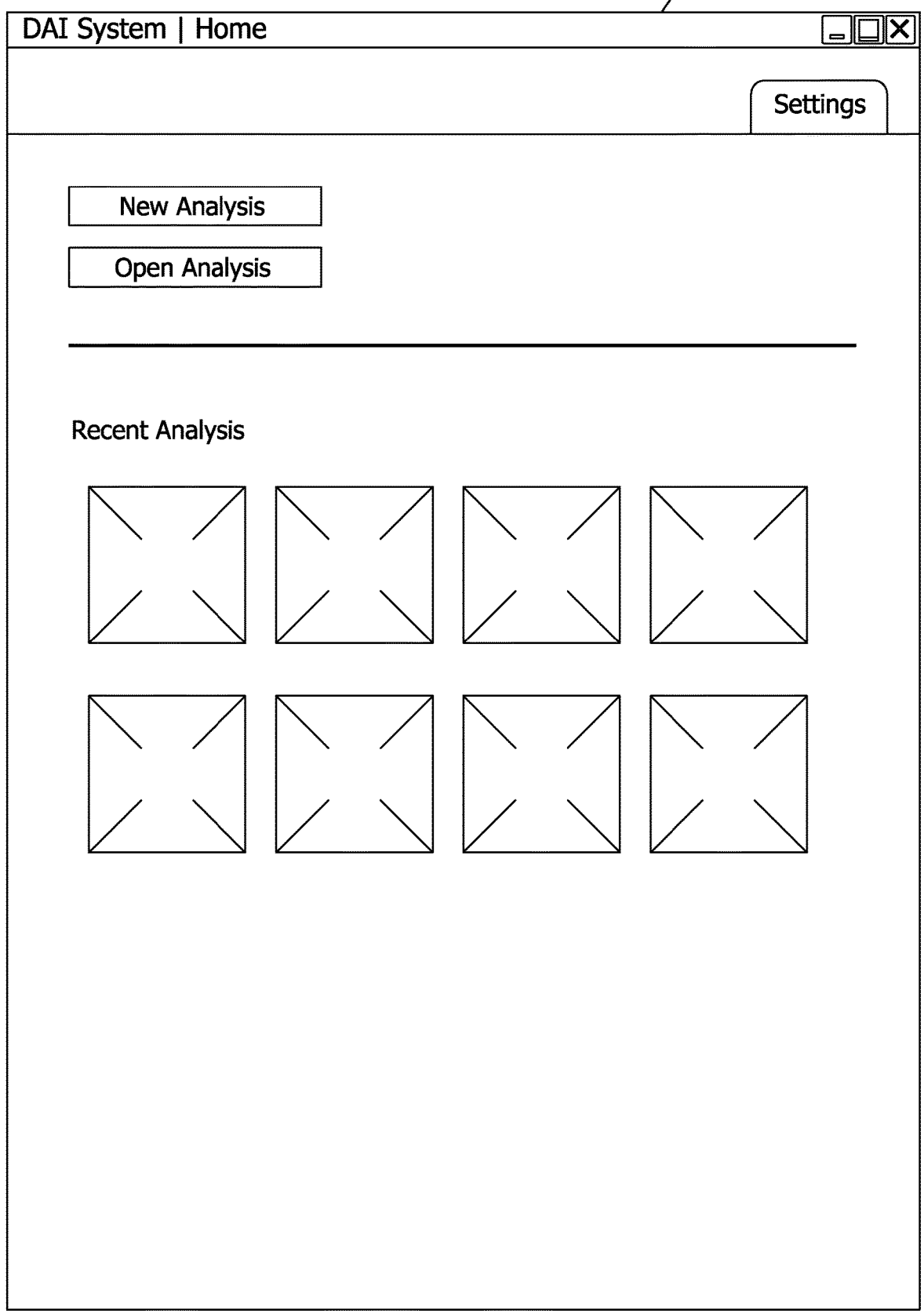
FIG. 24 is an example user interface utilized to establish a new analysis.

A user establishes a new analysis using embodiments illustrated in the user interface 1400 of FIG. 24. A new analysis establishes an empty analysis context aggregator that must be qualified. Opening an existing analysis allows the user to query the object database for a required analysis. Quick links shown in FIG. 24 allow the user to open recently accessed documents.

The user establishes and qualifies the new analysis using embodiments of user interface 900 described above with respect to FIG. 15. Part images are imported, and all necessary context attributes are qualified. The user establishes and qualifies the feature analysis using embodiments of user interface 950 described above with respect to FIG. 16. The feature data object is created, and the necessary feature attributes are qualified. For the specific feature analysis shown in user interface 1000 of FIG. 17, the appropriate analysis technique to be applied is selected, along with attendant tools, and the tool template as required. The expected data inputs required by this tool are specified via the user interface 1050 of FIG. 18, and the data outputs expected from the tool are also indicated, via the user interface 1100 of FIG. 19. This step is repeated for the number of features that will share the same feature analysis. An organizational technique will place all feature data objects that share the same analysis within a group folder. The feature analysis is executed individually for each data object, or collectively for each grouping of feature data object, if applicable.

The user establishes and qualifies the analysis and feature analyses with clarifying and justifying textual annotations and commentary—or analysis notes—using embodiments of the user interface 1150 of FIG. 20. Analysis notes can be applied individually to each feature object, collectively to the group of data objects, or at the context level of the analysis context aggregator. The embodiments shown in user interface 1150 indicate how the annotations are to be applied when published, using the order of sequence of the note (if more than one exists) as well as specifying the orientation of the note, for example, if it is to occur before or after the boilerplate analysis.

Figure 25:
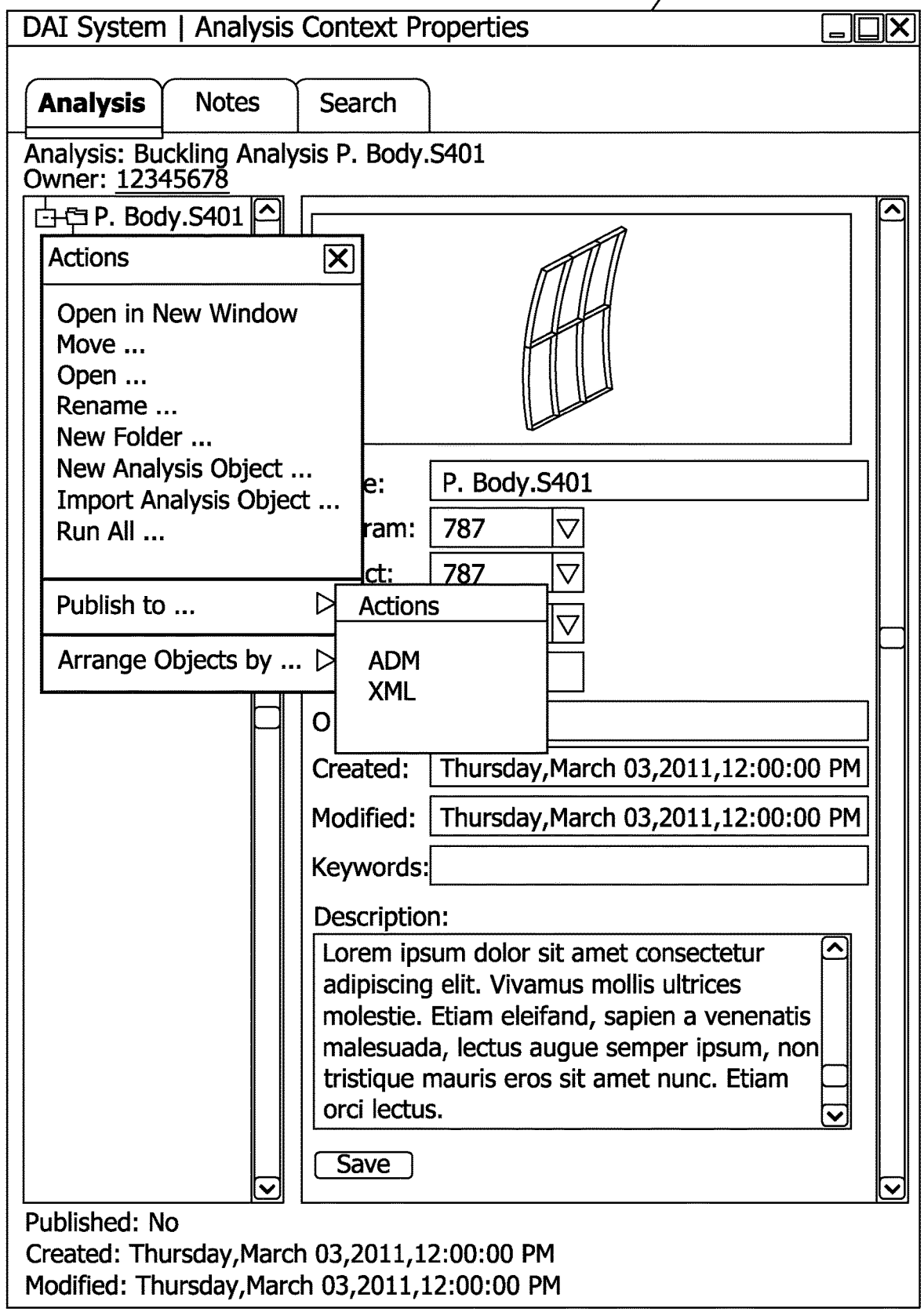
FIG. 25 is an example user interface utilized for publishing a completed analysis.
Figure 26:
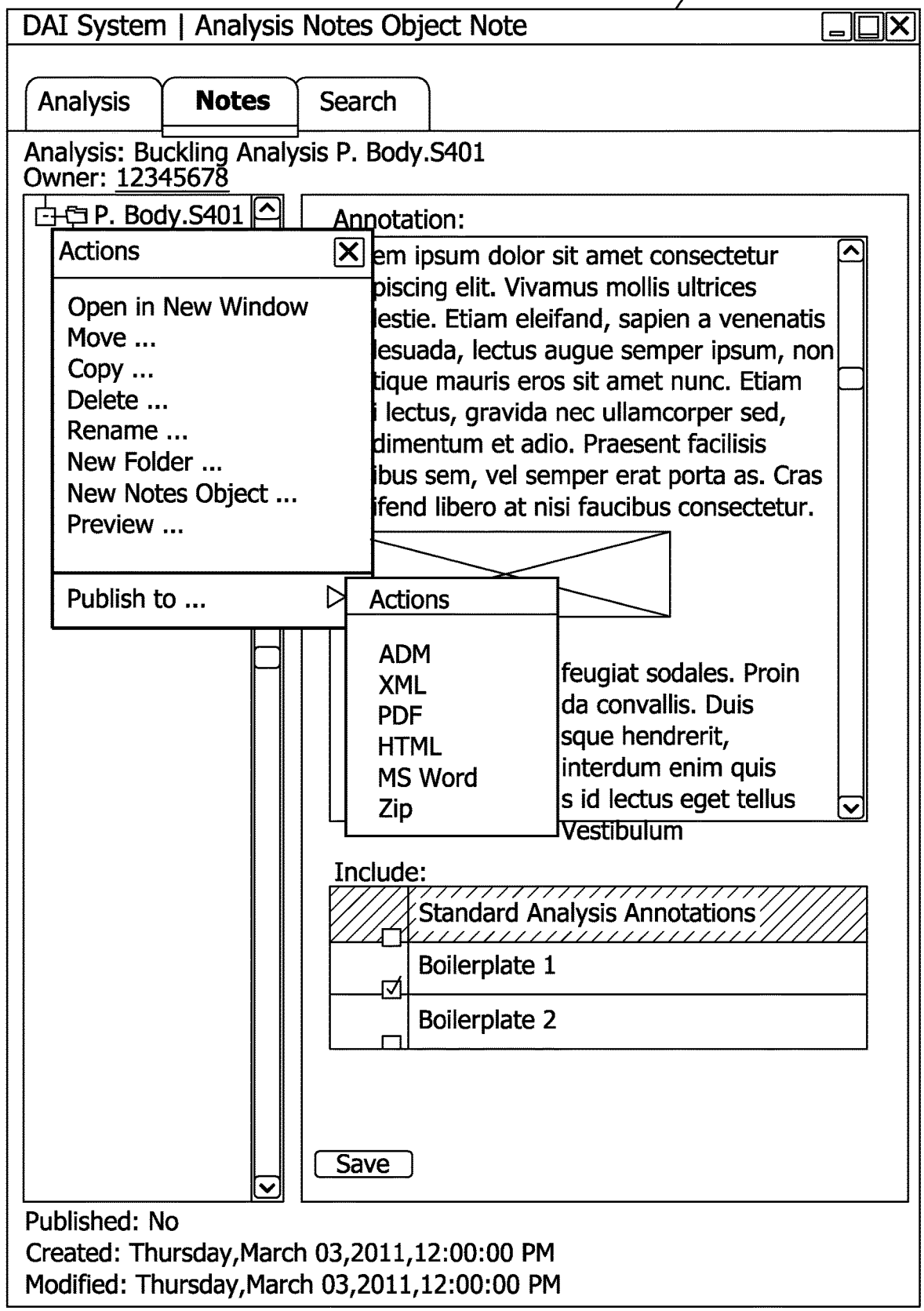
FIG. 26 is an example user interface utilized for publishing notes related to a completed analysis.

The user may publish the completed analysis and notes related to the analysis via the user interface embodiments 1500 and 1550 respectively of FIGS. 25 and 26. The complete analysis is published, in one embodiment, as an XML document to an external Product/Analysis Data Management System (PDM/ADM). An XML document 1600, shown in FIG. 27, archives all analysis object attributes and behaviors.

A user is able to publish a validation report 1650, an example of which is shown in FIG. 28. The validation report 1650 is a reinterpretation or derivative of the XML document published to the PDM/ADM. The validation report 1650 serves as the substantiating document for the analysis. An associated XML archive serves as the long-term repository for the analysis data objects and analysis notes object that produced the report. This storage allows for modifying and re-running the analysis as described herein.

Performance of the analysis as described herein relates to persisting data within a system. Currently, a typical usage scenario for learning some fact (or performing some analysis check) is for an engineer to spend a bunch of time gathering information (often from other analyses), create an input file for a monolithic application, run the input data through the application to produce results, and then view the results to gain the needed understanding or to see the results of the analysis check.

Such input and output files can be put in a repository, but even when this is done there is often a lack of context that allow the value of the data to be maintained over the time scales necessary for an analysis supporting an airplane or other system used over an extended lifespan. A lack of appropriate metadata can affect the ability to find the data as well. There is a considerable time requirement in order to create an input file and understand an output file.

The ADO embodiments described herein address these drawbacks as ADOs incorporate both inputs and outputs plus a rich set of context metadata to keep the data valuable over the decades it might be needed for fleet support. The method of storing the data as an analysis data object also defines an ability to provide output data it generates directly to another ADO (where it serves as input), so the reformatting of data is no longer needed.

In another aspect, models (e.g., three-dimensional representations) of parts into an analysis typically results in the extraction of geometric parameters from the models for use in the analyses being performed in the ADOs. Most stress analyses that are performed are based on geometric parameters rather than directly on part geometry as is done in structural finite element analysis. These parameters are usually one of the things being checked by analysis, so the original value is an input to a series of analysis checks which determine if the parameter (such as the thickness of a particular feature of a part) is going to work or not. If the structure fails a check directly affected by the parameter then the analyst recommends a change to the value of the parameter to allow the part to be declared adequate. As such, the parameter can be both an input and an output. An analysis is being used to check that the collection of features that make up a part are going to perform adequately in all the conditions it will experience during its service life.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. One or more non-transitory computer-readable storage media having computer-executable instructions embodied thereon, wherein when executed by at least one processor, the computer-executable instructions cause the at least one processor to:
   identify a part feature data object having a unique identifier and corresponding to a particular part feature of a monolithic part composed of a plurality of part features having respective unique identifiers, wherein the part feature data object has associated attributes related to the part feature available from a plurality of disparate sources of data related to the design, fabrication and testing of the monolithic part, the associated attributes related to the part feature including geometry properties of the part feature from a geometry model, and load and material properties of the part feature from a finite element model;
   define an analysis data object directed to the part feature, the analysis data object including attributes that reference the unique identifier of the part feature data object, and that reference the associated attributes related to the part feature;
   define a structural analysis of the part feature to be associated with the analysis data object, wherein the defined structural analysis is configured to receive data inputs and generate data outputs, wherein the data inputs include at least some of the associated attributes related to the part feature, including at least some of the geometric properties, load and material properties;
   perform a verification to determine that the associated attributes related to the part feature associated include all the data inputs needed for the defined structural analysis;
   in response to the determination, after performing the verification, that not all the data inputs needed are available, automatically access an additional data source to retrieve additional data to complete the defined structural analysis;
   execute the defined structural analysis of the part feature upon receipt of all the data inputs needed for the defined structural analysis, wherein execution of the defined structural analysis populates the analysis data object with the data inputs and the data outputs; and
   store the analysis data object including the data inputs and the data outputs, such that the data inputs and the data outputs are contained within the analysis data object, the analysis data object stored in an application independent format outside of the disparate sources of data.

2. One or more non-transitory computer-readable storage media having computer-executable instructions embodied thereon according to claim 1, wherein to create an analysis data object directed to the part feature, the computer-executable instructions cause the at least one processor to define, based on user identified properties related to the analysis data object, a plurality of parameters related to the part feature, the parameters in a format unrelated to applications that generate the parameters.

3. One or more non-transitory computer-readable storage media having computer-executable instructions embodied thereon according to claim 1, wherein when executed by at least one processor, the computer-executable instructions cause the at least one processor to receive user input relating to at least one of creating, preparing, or managing data relative to an analysis including properties directed to one or more of an analysis type, an analysis service, and a pre-defined template.

4. One or more non-transitory computer-readable storage media having computer-executable instructions embodied thereon according to claim 1, wherein to verify that the associated attributes related to the part feature include all the data inputs needed for the analysis, the computer-executable instructions cause the at least one processor to receive at least some of the data inputs including at least some of the geometric properties, load and material properties from respectively the geometry model and finite element model.

5. One or more non-transitory computer-readable storage media having computer-executable instructions embodied thereon according to claim 1, wherein to execute the defined structural analysis of the part feature, the computer-executable instructions cause the at least one processor to access and extract at least some of the geometric properties from the geometry model through a component object model interface.

6. One or more non-transitory computer-readable storage media having computer-executable instructions embodied thereon according to claim 1, wherein the computer-executable instructions cause the at least one processor to utilize an application programming interface request to expose features from the analysis data object, the request based on the unique identifier of the part feature data object.

7. One or more non-transitory computer-readable storage media having computer-executable instructions embedded thereon according to claim 1, wherein the additional data source is at least one of a user input, an external data source, or a similar analysis data object.

8. One or more non-transitory computer-readable storage media having computer-executable instructions embedded thereon according to claim 1, wherein the defined structural analysis is of the part feature as opposed to the monolithic part.

9. One or more non-transitory computer-readable storage media having computer-executable instructions embedded thereon according to claim 1, wherein to execute the defined structural analysis of the part feature, the computer-executable instructions cause the at least one processor to provide the data inputs, including the at least some of the associated attributes related to the part feature, including at least some of the geometric properties, load and material properties, to the defined structural analysis to generate the data outputs.

10. A system for design and analysis integration, said system comprising:
a processing device;
a memory communicatively coupled to the processing device;
a user interface communicatively coupled to the processing device; and
at least one communications interface communicatively coupled to the processing device, said processing device programmed to:
identify a part feature data object having a unique identifier and corresponding to a particular part feature of a monolithic part composed of a plurality of part features having respective unique identifiers, wherein the part feature data object has associated attributes related to the part feature available from a plurality of disparate sources of data related to the design, fabrication and testing of the monolithic part, the associated attributes relates to the part feature including geometric properties of the part feature from a geometry model, and load and material properties of the part feature from a finite element model;
define an analysis data object associated with the part feature, the analysis data object including attributes that reference the unique identifier of the part feature data object, and that reference the associated attributes related to the part feature;
define a structural analysis of the part feature that is associated with the analysis data object, wherein the defined structural analysis is configured to receive data inputs and generate data outputs, wherein the data inputs include at least some of the associated attributes related to the part feature, including at least some of the geometric properties, load and material properties;
perform a verification to determine that the associated attributes related to the part feature include all the data inputs needed for the defined structural analysis;
in response to the determination, after performing the verification, that not all the data inputs needed are available, automatically access an additional data source to retrieve additional data to complete the defined structural analysis, wherein the additional data source is an external data source;
execute the defined structural analysis after verifying all data inputs are available, wherein executing the defined structural analysis populates the analysis data object with the verified data inputs and data outputs that are results generated by the defined structural analysis; and
store the analysis data object including the data inputs from the disparate applications and sources and the data outputs generated by the defined structural analysis, such that the data inputs and the data outputs are contained within the analysis data object, the analysis data object stored in an application independent format outside of disparate applications and sources.

11. The system according to claim 10 wherein to verify that the associated attributes related to the part feature include all the data inputs needed for the analysis, said processing device is programmed to receive input of data related to at least one of design model data or analysis model data associated with the part feature.

12. The system according to claim 10 wherein said processing device is programmed to aggregate all defined data objects related to the part feature into an analysis context aggregator defined in said memory.

13. The system according to claim 10 wherein said processing device is programmed to:
create an analysis data object archetype with the data inputs, the data outputs, and a set of analysis specifications; and
generate an analysis data object instance based on the analysis data object archetype.

14. The system according to claim 10 wherein the additional data source is at least one of a user input, an external data source, or a similar analysis data object.

15. The system according to claim 10 wherein the defined structural analysis is of the part feature as opposed to the monolithic part.

16. The system according to claim 10 wherein to execute the defined structural analysis of the part feature, said processing device is programmed to provide the data inputs, including the at least some of the associated attributes related to the part feature, including at least some of the geometric properties, load and material properties, to the defined structural analysis to generate the data outputs.

17. A method for integrating design and analysis features and context metadata into persistent data, said method comprising:

identifying a part feature data object having a unique identifier and corresponding to a particular part feature of a monolithic part composed of a plurality of part features having respective unique identifiers, wherein the part feature data object has associated attributes related to the part feature available from a plurality of disparate sources of data related to the design, fabrication and testing of the monolithic part, the associated attributes related to the part feature including geometric properties of the part feature from a geometry model, and load and material properties of the part feature from a finite element model;

defining an analysis data object directed to the part feature, the analysis data object including attributes that reference the unique identifier of the part feature data object, and that reference the associated attributes related to the part feature;

defining a structural analysis of the part feature to be associated with the analysis data object, wherein the defined structural analysis is configured to receive data inputs and generate data outputs, wherein the data inputs include at least some of the associated attributes related to the part feature, including at least some of the geometric properties, load and material properties;

performing a verification, by a processor, to determine that the associated attributes related to the part feature include all the data inputs needed for the defined structural analysis;

in response to the determination, after performing the verification, that not all the data inputs are available, automatically accessing an additional data source to retrieve additional data to complete the defined structural analysis, wherein the additional data source is an external data source;

executing, by the processor, the defined structural analysis of the part feature after verifying all data inputs are available, wherein executing the defined structural analysis populates the analysis data object with the data inputs and the data outputs generated from the defined structural analysis; and storing the analysis data object including the data inputs and the data outputs generated by the defined structural analysis such that the data inputs and the data outputs are contained within the analysis data object, the analysis data object stored in an application independent format outside of the disparate applications and sources.

18. The method according to claim 17 further comprising generating an analysis data object instance, wherein generating an analysis data object instance comprises:

creating an analysis data object archetype with the data inputs, the data outputs, and a set of analysis specifications; and making an analysis data object instance based on the analysis data object archetype.

19. The method according to claim 17, wherein executing the defined analysis comprises:

receiving, at the processor via one or more communications interfaces, design model data extracted from at least one computer aided design application, the design model data relating to one or more properties of the part feature; and receiving, at the processor via the one or more communications interfaces, analysis model data extracted from at least one computer aided design tool, the analysis model data relating to one or more properties of the part feature.

20. The method according to claim 17 wherein defining the analysis comprises:

identifying properties relating to expected data outputs to be expected from the analysis data object; and transforming data objects produced from the data inputs to produce the data outputs.

21. The method according to claim 17 further comprising obtaining the data inputs from one or more managed data sources, wherein obtaining the data inputs from one or more managed data sources comprises using an analysis context aggregator to obtain the data inputs from managed data sources.

22. The method according to claim 17 further comprising aggregating a plurality of analysis data objects relative to a part analysis into an analysis context aggregator based on a query of the analysis data objects; and packaging the results of the query for viewing within a user interface.

23. The method according to claim 17 further comprising generating an analysis data object instance, wherein generating an analysis data object instance comprises at least one of:

selecting properties relative to the part feature, the properties representing unique characteristics of a part analysis; or identifying properties relating to the defined analysis to be performed.

24. The method according to claim 17, further comprising storing the analysis data object such that the analysis data object encapsulates each input, output, and operation that produced results of the defined structural analysis.

25. The method according to claim 17 wherein the defined structural analysis is of the part feature as opposed to the monolithic part.

26. The method according to claim 17 wherein executing the defined structural analysis of the part feature comprises the processor providing the data inputs, including the at least some of the associated attributes related to the part feature, including at least some of the geometric properties, load and material properties, to the defined structural analysis to generate the data outputs.

* * * * *

UNITED STATES PATENT AND TRADEMARK OFFICE
CERTIFICATE OF CORRECTION

PATENT NO. : 10,748,092 B2  
APPLICATION NO. : 13/155076  
DATED : August 18, 2020  
INVENTOR(S) : David Levermore et al.

Page 1 of 1

It is certified that error appears in the above-identified patent and that said Letters Patent is hereby corrected as shown below:

In the Claims

In Column 16, Claim 1, Line 22, "geometry properties" should read -- geometric properties --.

In Column 18, Claim 10, Line 2, "relates to the part" should read -- related to the part --.

Signed and Sealed this  
Twenty-second Day of December, 2020

Andrei Iancu  
*Director of the United States Patent and Trademark Office*